United States Patent
Nomura

(10) Patent No.: US 8,317,579 B2
(45) Date of Patent: Nov. 27, 2012

(54) GAME APPARATUS AND PROGRAM

(75) Inventor: Tetsuya Nomura, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 730 days.

(21) Appl. No.: 12/476,366

(22) Filed: Jun. 2, 2009

(65) Prior Publication Data

US 2009/0305758 A1    Dec. 10, 2009

(30) Foreign Application Priority Data

Jun. 5, 2008    (JP) ................................. 2008-148147

(51) Int. Cl.
    *A63F 9/24*    (2006.01)
(52) U.S. Cl. .................... 463/7; 463/8; 463/32; 463/36; 463/42
(58) Field of Classification Search ........................ None
    See application file for complete search history.

(56) References Cited

U.S. PATENT DOCUMENTS

| | | | |
|---|---|---|---|
| 5,390,937 A | 2/1995 | Sakaguchi et al. | |
| 6,743,099 B2 * | 6/2004 | Yabe et al. ...................... | 463/36 |
| 7,824,265 B2 * | 11/2010 | Kobayashi ...................... | 463/33 |
| 7,841,943 B2 * | 11/2010 | Nomura ........................... | 463/30 |
| 7,963,834 B2 * | 6/2011 | Ichimura ........................... | 463/8 |
| 8,021,220 B2 * | 9/2011 | Sakamoto et al. ................ | 463/5 |
| 2002/0107060 A1 * | 8/2002 | Ohnuma et al. ................... | 463/7 |
| 2002/0119811 A1 * | 8/2002 | Yabe et al. ........................ | 463/8 |
| 2003/0096648 A1 * | 5/2003 | Ohno et al. ....................... | 463/32 |
| 2005/0181849 A1 * | 8/2005 | Kobayashi et al. ............... | 463/7 |
| 2006/0183521 A1 * | 8/2006 | Hamamoto ........................ | 463/8 |
| 2007/0191096 A1 | 8/2007 | Tanaka | |
| 2007/0200855 A1 | 8/2007 | Minagawa | |
| 2007/0265047 A1 * | 11/2007 | Nomura ............................ | 463/8 |
| 2008/0139308 A1 | 6/2008 | Kamiyama et al. | |

FOREIGN PATENT DOCUMENTS

| JP | 6-105959 | 4/1994 |
|---|---|---|
| JP | 2007-244693 | 9/2007 |

OTHER PUBLICATIONS

English language Abstract of JP 6-105959, Apr. 19, 1994.
English language Abstract of JP 2007-244693, Sep. 27, 2007.

* cited by examiner

*Primary Examiner* — David E Graybill
(74) *Attorney, Agent, or Firm* — Greenblum & Bernstein, P.L.C.

(57) ABSTRACT

A video game is provided in which a player can switch a player character in a battle to an enemy character by a switching operation. With such a switching operation, the player performs the battle with the enemy character. If a predetermined time elapses, the enemy character is switched back to the player character. At this time, an HP of the enemy character reflects on an HP of the player character. If a special ability of the enemy character is used, the special ability is inherited by the player character and can be used in battles thereafter.

20 Claims, 7 Drawing Sheets

| | NORMAL CHARACTER (BEFORE SWITCHING) | TEMPORARY CHARACTER (BEFORE SWITCHING BACK) | NORMAL CHARACTER (AFTER SWITCHED BACK) |
|---|---|---|---|
| LEVEL | 5 | 4 | 5 |
| HP | 500 | 700 | 600 |
| SPECIAL ABILITY | FIRE, CURE | BLIZZARD | FIRE, CURE, BLIZZARD |

(a)

(b)

|  | NORMAL CHARACTER (BEFORE SWITCHING) | TEMPORARY CHARACTER (BEFORE SWITCHING BACK) | NORMAL CHARACTER (AFTER SWITCHED BACK) |
|---|---|---|---|
| LEVEL | 5 | 4 | 5 |
| HP | 500 | 700 | 600 |
| SPECIAL ABILITY | FIRE, CURE | BLIZZARD | FIRE, CURE, BLIZZARD |

GAME APPARATUS AND PROGRAM

CROSS REFERENCE TO RELATED APPLICATION

The present disclosure relates to subject matter contained in Japanese Patent Application No. 2008-148,147, filed on Jun. 5, 2008, the disclosure of which is expressly incorporated herein by reference in its entirety.

BACKGROUND OF THE INVENTION

1. Field of the Invention

The present invention relates to a game apparatus that executes a video game, in which a battle occurs between a player character and an enemy character. More particularly, the present invention relates to a game apparatus that executes a video game, in which player characters include a temporary character that may temporarily be an operation object of the player and a normal character that becomes the operating object except for a time when the temporary character becomes the operation object.

2. Description of the Related Art

Conventionally, it is known that a video game in which a battle occurs between a player character operated in accordance with an operation of a player and an enemy character operated not in accordance with the operation of the player but in accordance with a program executed by a CPU of a game machine in a progress of the game. In such game, a plurality of player characters operated in accordance with the operation of the player may participate in the battle.

In a stand-alone video game where a plurality of players do not participate and the game is progressed by only one player, when a plurality of player characters participate in a battle, it is not possible to know, for which player character, an instruction is input from an input device in accordance with the operation of the player unless only one player character is defined to be an operation object of the player. Accordingly, when the plurality of player characters participate in the battle, a player character to be the operation object of the player is switched.

In this case, as an approach for switching the player character to be the operation object of the player, there is a turn-based approach in which a player character to be the operation object is specified in turn in accordance with a program executed by a CPU. Further, there is an approach in which a predetermined time is set for each player character and a player character becomes the operation object of the player in order, from a player character with the predetermined time elapsed (for example, refer to Japanese Patent Application Laid-open No. 6-105959 (paragraphs 0002 and 0027)). Furthermore, there is an approach in which a player character to be the operation object is switched in accordance with selection based on an operation of a player (for example, refer to Japanese Patent Application Laid-open No. 2007-244693 (paragraph 0028)).

As the game, in which a battle occurs between a player character and an enemy character in the progress of the game as described above, a roll playing game (RPG) is well known. In many of the RPG's, a plurality of player character can participate in the battle. Even though a plurality of player character can be operated in accordance with the operation of the player, only one character can be specified to be a main character in the RPG in most cases, while a player can select a player character to be a main character from a plurality of characters when starting the game in some cases. This is because one of amusements of the RPG is that a player acts a player character as a main character in the virtual world.

Even though the plurality of player characters are operated in accordance with the operation of the player, when only one player character can be specified to be a main character as described above, a game is generally progressed by an operation for the player character that is the main character in scenes of the game other than the battle. Even in the scenes of the game other than the battle, a party including a plurality of player characters may be operated, however, it is not changed that the player character that is the main character is mainly operated.

In addition, in the conventional RPG's, a portion of a game other than a battle, which is progressed by a player character that is a main character or progressed while the player character is mainly operated, and a portion of a battle, in which a player character to be the operation object is switched, are weakly associated. Therefore, an amusement of a battle with the enemy character while the player character to be the operation object is switched is completed in a single battle, and such amusement cannot be an amusement of the entire progress of the game.

SUMMARY OF THE INVENTION

Accordingly, it is an object of the present invention to provide a vide game in which a player can feel an amusement by switching a player character to be an operation object at a battle with an enemy character even at a game performed after the battle is completed.

In order to achieve the above-described object, there is provided a game apparatus that executes a video game, in which player characters are operated in accordance with an operation of a player, the player characters including at least one temporary character that may temporarily be an operation object of the player in the progress of the game, and a normal character that becomes the operation object through the entire progress of the game except for a time when the temporary character becomes the operation object, the game apparatus comprising: an ability data storage that stores ability data specifying an ability of the normal character in the game and ability data specifying an ability of the temporary character in the game; a switching possible/impossible determiner that determines whether it is possible or not to switch an operated character that is the operation object of the player between the player characters, in accordance with an instruction input from the player so as to switch the operated character; an operated character switcher that switches the operated character from the normal character to the temporary character in accordance with the instruction input from the player, when the switching possible/impossible determiner determines that it is possible to switch the operated character; an operated character operator that operates the operated character, in accordance with the instruction input from the player so as to operate the operated character, in accordance with the ability data for the operated character; and an ability data updater that updates the ability data of the normal character in accordance with the ability data of the temporary character switched to be the operation object, when the operated character switcher switches the operated character. In order to achieve the above-described object, according to a first aspect of the present invention, there is provided a game apparatus that executes a video game in which a battle occurs, in a progress of a game, between player characters operated in accordance with an operation of a player and an enemy character different from the player character. The player character includes at least one temporary character that may temporarily be an operation object of the player in the progress of the game and a normal character that becomes the operation object through the entire progress of the game except for a time when the temporary character becomes the operation object. The game apparatus includes: an ability data storage that stores ability data specifying an ability of the normal character in the game and ability data specifying an ability of the temporary character in the game; a switching instruction input system that inputs an instruction from the player so as to switch a character to be the operation object of the player between the player characters; an operated character switcher that switches the character to be the operation object of the player from the normal character to the temporary character in accordance with the instruction input from the switching instruction input system; an operation instruction input system that inputs an instruction from the player so as to operate the character that is currently the operation object of the player in the battle in accordance with the ability data stored in the ability data storage for the character that is currently the operation object of the player; an operated character operator that operates the character that is currently the operation object of the player in the battle in accordance with the instruction input from the operation instruction input system; an operation effect generator that generates a predetermined effect on the player character and/or the enemy character in the battle corresponding to a result of an operation of the character that is currently the operation object of the player by the operated character operator; an enemy character operator that determines an operation of the enemy character and operates the enemy character in the battle in accordance with the determination; an enemy effect generator that generates a predetermined effect on the player character and/or the enemy character in the battle corresponding to the result of an operation of the enemy character by the enemy character operator; and an ability data updater that updates the ability data of the normal character stored in the ability data storage in accordance with the ability data of the temporary character switched to be the operation object when the operated character switcher switches the character to be the operation object of the player from the normal character to the temporary character.

In the game apparatus, the battle occurs between the player character and the enemy character in the progress of the game. The player character that can be the operation object through the entire progress of the game including the battle is the normal character. However, in the progress of the game, a character to be the operation object can be temporarily switched to the temporary character.

As such, the player progresses the game while operating the normal character by his/her operation while at the time of the battle, the player can switch the character to be the operation object from the normal character to the temporary character. In this case, when the player switches the character to be the operation object from the normal character to the temporary character in the battle, the ability data of the normal character that is stored in the ability data storage is updated in accordance with the ability data of the temporary character switched to be the operation object.

The updated ability data of the normal character is still stored in the ability data storage even when the game is continuously performed after the battle is completed. Therefore, when the operation character is switched from the normal character to the temporary character in the battle, this affects the progress of the game that is continues after the operation object is switched back to the normal character. As such, an amusement of the game that is generated by switching the character to be the operation object from the normal character to the temporary character is not completed only in the battle. Therefore, it is possible for a player to play the game with an amusement generated by the switching of the character as an amusement in the entire progress of the game.

Further, since the ability data of the temporary character that is switched to be the operation object reflects on the ability data of the normal character, when the character to be the operation object is switched into the temporary character, the player feels as if the temporary character is possessed by the normal character, and then an amusement of the game can be increased.

In the game, which is progressed while moving the player character in accordance with the operation of the player on the field that is formed in a virtual space and in which a battle occurs when the player character reaches a predetermined position on the field (RPG, for example), the player character, which is moved on the field in accordance with the operation of the player, may be the normal character. Meanwhile, the temporary character may be a character that can be operated only in a battle field of the occurred battle.

Further, in the game, which is progressed while moving the player character in accordance with the operation of the player on the field that is formed in the virtual space and in which, however, enemy characters are disposed on the field and the player character moves on the field while having a battle with the enemy character (action RPG, for example), the player character that is moved on the field in accordance with the operation of the player may be the normal character. Meanwhile, the temporary character may be a character that can be switched to be the operation object from the normal character, when the distance between the normal character and the enemy character on the field is within the predetermined distance or when the normal character attacks the enemy character or is attacked by the enemy character.

Further, the temporary character may be a character that can be the operation object only in the battle in the progress of the game (when the battle is completed, even if the operation object at the time of the completion of the battle is the temporary character, the operation object is switched back to the normal character). Further, the temporary character can be switched to be the operation object only in the battle. However, when the temporary character is the operation object at the time of the completion of the battle, the temporary character may still be the operation object until a predetermined period elapses after the completion of the battle (for example, until the operation object is switched into another temporary character or one stage is completed in a game including a plurality of stages).

Further, the ability data of the normal character that is updated by the ability data updater may be the predetermined parameter that is increased or decreased in accordance with the progress of the battle (for example, an HP that is decreased by the attack from the enemy character and when the value is decreased to the predetermined value, the battle cannot be continued, and an MP that is lowered whenever a special attack such as a magic attack is performed) or a maximum value of the predetermined parameter. Here, it is possible to increase the predetermined parameter of the normal character in accordance with a value of the predetermined parameter that is set as the ability data of the temporary character switched to be the operation object.

Further, the ability data of the normal character may be an attribute to increase or decrease an effect of a special ability, or an ability to define a kind of a special ability exercised as an attack with respect to the enemy character or a kind of a special protective measurement (for example, magic to recover a decreased parameter) that can be exercised itself.

That is, an ability that is set as ability data of a temporary character switched to be an operation object can be gained as an ability of the normal character. Further, a weapon and/or protective equipment that the temporary character switched to be the operation object carries and an item that the temporary character has can be gained by the normal character.

Further, in addition to the determination of the ability in the game, an appearance feature of the normal character that simply appears on a display screen of the game may be varied in accordance with an appearance feature of the temporary character that is switched to be the operation object of the player. For example, the normal character may wear the clothes or accessories that the temporary character switched to be the operation object wears or a color of a hair of the normal character may be changed to a color of a hair of the temporary character that is switched to be the operation object.

Further, the predetermined effect in the battle that is generated by the operation effect generator may be lowering a predetermined parameter (so-called HP or the like) of the enemy character due to an attack of the player character (the normal character or the temporary character) to the enemy character, invalidating an ability (for example, magic attack or the like) of a predetermined kind among the abilities that the enemy character has, or increasing a predetermined parameter that is included in ability data of the player character (the normal character or the temporary character). The same applies to the predetermined effect in the battle that is generated by the enemy effect generator.

Further, the ability data updater may provide up to the predetermined amount in the ability data of the temporary character switched to be the operation object to the normal character, when the ability data of the normal character is updated. Further, the ability data updater can update the ability data of the normal character with a predetermined probability (which may be determined in accordance with the temporary character switched to be the character to be the operation object), when the operated character switcher switches the character to be the operation object of the player from the normal character to the temporary character.

In the game apparatus, the operated character switcher can switch the character to be the operation object of the player from the normal character to the temporary character, only for a predetermined period after the instruction is input from the switching instruction input system. Alternatively, the operated character switcher can switch the character to be the operation object of the player into the temporary character and then keep the temporary character as the operation object of the player until an instruction to switch the character to be the operation object into the normal character is input.

Further, the operated character switcher can switch the character to be the operation object of the player from the normal character to the temporary character, in accordance with the ability data of the normal character. For example, when the predetermined parameter needed for switching of the character to be the operation object as the ability data of the normal character is set (updated in accordance with the progress of the game), it is possible to switch the character to be the operation object of the player from the normal character to the temporary character, under the condition that the value of the corresponding parameter is a predetermined value or more (it may be possible to consume the predetermined parameter by the switching).

Further, the operated character switcher can switch the character to be the operation object of the player from the normal character to the temporary character, in accordance with a relationship between the ability data of the normal character and ability data of the temporary character. For example, when levels (the level of at least the normal character is updated in accordance with the progress of the game) are set as the ability data of the normal character and the temporary character, the character to be the operation object of the player can be switched from the normal character to the temporary character, under the condition that the level set to the normal character is higher than (or equal to) the level set to the temporary character.

The game apparatus may further include: a mode instruction input system that inputs an instruction from the player to switch a mode into a switchable mode where reception of the instruction input from the switching instruction input system is enabled; a mode switcher that switches the mode from a non-switchable mode where the reception of the instruction input from the switching instruction input system is disabled to the switchable mode, in accordance with the instruction input from the mode instruction input system; and a character operation restriction system that restricts the operation of the player character to be the operation object of the player by the operation character operator in accordance with the instruction input from the operation instruction input system, when the mode is the switchable mode. In this case, the enemy character operator may operate the enemy character, even when the mode is the switchable mode.

In this case, in order to switch the character to be the operation object of the player from the normal character to the temporary character, at first, the mode needs to be changed to the switchable mode in accordance with the input from the mode instruction input system. In the switchable mode, the operation of the player character according to the instruction that is input from the operation instruction input system is restricted. Meanwhile, even in the switchable mode where the operation of the play character is restricted, the enemy character operator freely operates the enemy character.

That is, since the switchable mode is a risky state for the player where the player character (the normal character and/or the temporary character) can be one-sidedly (or almost one-sidedly) attacked by the enemy character, it is preferable to switch to the temporary character immediately after the mode is switched to the switchable mode. Therefore, even though a time restriction is not set or set in switching of the character to be the operation object of the player from the normal character to the temporary character, a time restriction is provided to the psychology of the player more strongly than the set time restriction. As a result, it is possible to increase an amusement when the character to be the operation object in the battle is switched.

Here, the mode switcher can switch the mode from the non-switchable mode to the switchable mode and keeps the mode only for the predetermined period after the instruction is input from the mode instruction input system. Further, when the operated character switcher switches the character to be the operation object of the player from the normal character to the temporary character and keeps the situation only for the predetermined period after the instruction is input from the switching instruction input system, the predetermined period can be set in accordance with the elapsed time until the instruction is input from the switching instruction input system after the mode is switched into the switchable mode.

Further, when the video game is a three-dimensional video game that generates a display screen of the game by performing a perspective transformation of a three-dimensional virtual space by a virtual camera, the game apparatus may further include a virtual camera controller that controls a position of a visual point of the virtual camera to perform the perspective transformation to a predetermined position for a character being the operation object of the player when the mode is not the switchable mode, and controls the position of the visual point to a position of the character being the operation object of the player when the mode is the switchable mode.

In this case, when the mode is the switchable mode, the player can have an impression from the displayed game screen that the player becomes the normal character and searches the temporary character to which the operation object is switched. Accordingly, it is possible to increase realistic sensation of the game.

Further, when the mode is not the switchable mode, the predetermined position of the visual point of the virtual camera may be set to a position different from a position of any one of the characters including the normal character, the temporary character, and the enemy character, and set to a predetermined position (other than the position of the character) with respect to the character that is currently the operation object of the player. When the mode is the switchable mode, the position of the character where the position of the visual point of the virtual camera is set may be the position of the normal character (eyes in particular).

The game apparatus may further include a display controller at the time of switching that controls special effect display (for example, white-out/white-in) on the display screen of the game, when the operated character switcher switches the character to be the operation object of the player from the normal character to the temporary character.

In this case, the player can have an impression from the displayed game screen that switching of the operation object from the normal character to the temporary character is a special phenomenon. Accordingly, it is possible to increase realistic sensation of the game.

The game apparatus may further include a character mover that moves the normal character on a field where the battle occurs, in addition to the operation performed in accordance with the instruction input from the operation instruction input system when the normal character is the operation object while the battle is progressing. In this case, the operated character switcher may switch the character to be the operation object of the player from the normal character to the temporary character, under the condition that a positional relationship between the normal character and the temporary character according to the movement by the character mover is a predetermined positional relationship.

In this case, in order to switch the character to be the operation object from the normal character to the temporary character, the player needs to move the position of the normal character, such that the positional relationship with the temporary character becomes the predetermined positional relationship. Therefore, the player needs to move the normal character in consideration of the positional relationship between the normal character and the temporary character as well as the positional relationship between the normal character and the enemy character, and thus a strategic characteristic can be further improved in the movement operation of the normal character in the battle.

Here, the predetermined positional relationship that is used when determining whether the operated character switcher switches the character to be the operation object of the player may be that the distance between the normal character and the temporary character is within the predetermined distance.

Here, when the game apparatus further includes a timer that counts time elapsed from predetermined timing associated with the battle, the predetermined positional relationship may vary in accordance with time that is counted by the timer.

In this case, for example, even in the case where a disadvantageous positional relationship with respect to the enemy character is generated by moving the normal character to a position that enables switching of the character to be the operation object from the normal character to the temporary character at a timing during the battle, there may be a case where the character to be the operation object may be switched from the normal character to the temporary character by only moving the normal character to a position where a relatively advantageous positional relationship with respect to the enemy character may be generated after waiting for a time to elapse. Thereby, a strategic characteristic in the battle can be improved.

For example, in the case where the predetermined positional relationship is set that the distance between the normal character and the temporary character is within the predetermined distance, the predetermined distance can be set to be shorter as the time counted by the timer is increased.

Further, as the predetermined timing that is related to the battle when the timer starts counting, timing when the distance between the enemy character and the normal character that are disposed on the field is within the predetermined distance can be adapted, in a type of a game where the normal character moves on the field while having battles with the enemy characters (generally, an action RPG corresponds to the type). Further, in a type of a game where the enemy character appears, and the battle starts when the normal character approaches a battle point disposed on the field (generally, an RPG corresponds to the type), timing when the battle starts can be adapted.

Further, when switching from the normal character to the temporary character in the battle is allowed more than once, as the predetermined timing associated with the battle where the timer starts counting, timing when the character to be the operation object is switched from the normal character to the temporary character or switched back from the temporary character to the normal character can be adopted.

In the game apparatus, when ability data that is stored in the ability data storage with respect to the character being the operation object of the player specifies that the corresponding character has plural kinds of abilities, the operation instruction input system may input an instruction to operate the corresponding character based on one of the plural kinds of abilities. In this case, when the operated character switcher switches the character to be the operation object of the player from the normal character to the temporary character, the ability data updater may update ability data of the normal character in accordance with ability data with respect to an ability of a kind corresponding to the instruction of the operation that is input by the operation instruction input system.

In this case, the ability data of the normal character is not updated by only switching the character to be the operation object in the battle into the temporary character, and is not updated unless the temporary character switched to be the operation object is operated. Moreover, only the ability data of the normal character is updated in accordance with the ability data with respect to the ability of the kind instructed as the operation of the temporary character. Therefore, since the player can have the impression that the normal character gains the ability that the temporary character has only when the temporary character is possessed by the normal character and operates, an amusement of the game can be increased.

The game apparatus may further include a temporary ability data changer that changes ability data of the temporary character switched to be the operation object in accordance with ability data of the normal character, when the operated character switcher switches the character to be the operation object of the player from the normal character to the temporary character.

In this case, when the character to be the operation object of the player is switched from the normal character to the temporary character, the ability data that is stored in the ability data storage as the ability data of the temporary character is not used as it is, and the ability data on which the ability data of the normal character is reflected is used. Therefore, when the character to be the operation object is switched into the temporary character, the player feels the temporary character is possessed by the normal character even by operating the temporary character as the operation object. As a result, an amusement of the game can be increased.

Further, when the operated character switcher switches the character to be the operation object of the player from the normal character to the temporary character, the appearance feature that appears on the display screen with respect to the game of the temporary character may also be varied in accordance with the appearance feature of the normal character.

In the game apparatus, the player characters may include a plurality of temporary characters each of which can be switched to be the operation object of the player by the operated character switcher. In this case, the ability data storage may store ability data of at least one temporary character of the plurality of temporary characters, which is different from ability data of at least one different temporary character. Here, the number of temporary characters which can be used when the ability data updater updates the ability data of the normal character is preferably smaller than the number of temporary characters which can be switched to be the operation object of the player by the operated character switcher.

In this case, the plurality of temporary characters that can be switched to be the operation object of the player appear in the battle. The plurality of temporary characters have ability data that are different from each other. Meanwhile, the number of temporary characters which are used as an object when the ability data updater updates the ability data of the normal character is preferably smaller than the number of temporary characters. Therefore, not only the fact that the character to be the operation object is switched into the temporary character but also the fact, into which temporary character, the character to be the operation object is switched affects the progress of the game thereafter. Thereby, a strategic characteristic of the game is further improved.

In the game apparatus, enemy characters may exist and the enemy characters have abilities different for each of the enemy characters which are set as abilities in the game. In this case, the game apparatus may further include a battle generator that generates battles for plural times where the kinds of the enemy characters having battles with the player character are different from each other in accordance with the progress situation of the game. Here, a predetermined effect, which is generated on the enemy character in accordance with a result of operating the character being the operation object of the player by the operation effect generator, may be different according to an ability set to the corresponding enemy character, and a predetermined effect, which is generated on the player character in accordance with a result of operating the enemy character by the enemy effect generator, may be different according to an ability set to the corresponding enemy character.

Further, in the battles of the plural times that are generated by the battle generator in accordance with the progress situation of the game, the kind of the temporary character that can be switched to be the operation object of the player from the normal character may be different for every battle.

Here, in the progress of the game, the battles of the plural times are generated. The development of each of the battles of the second battle or later is varied depending on how the ability data of the normal character is updated in the previous battle. Therefore, the player needs to perform the battle at a current point of time in consideration of not only the battle at the current point of time but also the battle that will be generated in the progress of the game, and thus a strategic characteristic of the game is further improved.

In this case, the game apparatus may further include an enemy information notifier that notifies the player of information that is related to the ability set to the enemy character that will have a battle with the player character in the battle, which will be generated when the progress situation of the game proceeds further than the current point of time. The information that is notified by the enemy information notifier may be information (so-called clue) that is used by the player for estimating the ability set to the enemy character.

Further, when the information that is related to the ability set to the enemy character that will have a battle with the player character in the battle, which will be generated when the progress situation of the game proceeds further than the current point of time, is notified by the enemy information notifier, the ability data of the normal character may need to be updated in accordance with the notified information, in order to for the player character to win the enemy character in the future battle.

Further, the progress situation to determine if the battle generator generates the battle can include to which position in the field, the player character (normal character in this case) reaches, in a game where the player character is moved on the field that is formed in a virtual space in accordance with the operation of the player and the battle is generated when the player character reaches a predetermined position of the field (RPG, for example).

Further, the game is progressed while moving the player character in accordance with the operation of the player on the field that is formed in the virtual space. However, the game in which a plurality of enemy characters are disposed on the field and the player character moves on the field while having a battle with the enemy characters (action RPG, for example), the battle generator may generate the battle, when the normal character attacks the enemy character or is attacked by the enemy character.

In order to achieve the above-described object, according to a second aspect of the present invention, there is provided a computer readable medium that stores an executable computer program that allows a computer device to execute a video game in which a battle occurs, in a progress of the game, between player characters operated in accordance with an operation of a player and an enemy character different from the player characters, the player characters including a temporary character that may temporarily be an operation object of the player in the progress of the game and a normal character that becomes the operation object through the entire progress of the game except for a time when the temporary character becomes the operation object, the computer readable medium comprising: an executable ability data managing code segment stored on the computer readable medium that, when executed, stores ability data specifying an ability of the normal character in the game and ability data specifying an ability of the temporary character in the game in a storage device of the computer device and manages the ability data; an executable switching instruction input accepting code segment stored on the computer readable medium that, when executed, accepts a predetermined instruction input in accordance with the operation of the player from the input device of the computer device so as to switch a character of the player character to be the operation object of the player; an executable operation character switching code segment stored on the computer readable medium that, when executed, switches the character to be the operation object of the player from the normal character to the temporary character in accordance with the instruction accepted by the switching instruction input accepting code segment; an executable operation instruction input accepting code segment stored on the computer readable medium that, when executed, accepts a predetermined instruction input in accordance with an instruction of the player from the input device of the computer device so as to operate the character that is currently the operation object of the player in the battle in accordance with the ability data stored in the ability data managing code segment; an executable operation character operating code segment stored on the computer readable medium that, when executed, operates the character that is currently the operation object of the player in the battle in accordance with the instruction accepted by the operation instruction input accepting code segment; an executable operation effect generating code segment stored on the computer readable medium that, when executed, generates a predetermined effect on the player character and/or the enemy character in the battle according to a result, which is obtained by operating the character that is currently the operation object of the player by the operation character operating code segment; an executable enemy character operating code segment stored on the computer readable medium that, when executed, determines an operation of the enemy character and operates the enemy character in the battle in accordance with the determination; an executable operation effect generating code segment stored on the computer readable medium that, when executed, generates a predetermined effect on the player character and/or the enemy character in the battle according to a result, which is obtained by operating the enemy character by the enemy character operating code segment; and an executable ability data updating code segment stored on the computer readable medium that, when executed, updates the ability data of the normal character managed in the storage device by the ability data managing code segment in accordance with the ability data of the temporary character switched to be the operation object, when the operation character switching code segment switches the character to be the operation object of the player from the normal character to the temporary character.

A program according to the second aspect of the present invention can be recorded in a computer readable medium and provided. The computer readable medium may be configured to be detachable to the computer device, and provided separately from the computer device. The computer readable recording medium may be a fixed disk device provided in the computer device and provided together with the computer device. The program according to the second aspect can be distributed from a server device existing on a network through the network to the computer device, by superimposing a data signal to a carrier wave.

A method for performing processes of the each of the units included in the game apparatus according to the first aspect as a process in each of steps and a method that executes processes of the individual code segments included in the program according to the second aspect as a process in each of steps are also included in a range of the present invention.

DETAILED DESCRIPTION OF THE EXEMPLARY EMBODIMENTS

Hereinafter, exemplary embodiments of the present invention will be described with reference to the accompanying drawings.

Figure 1:
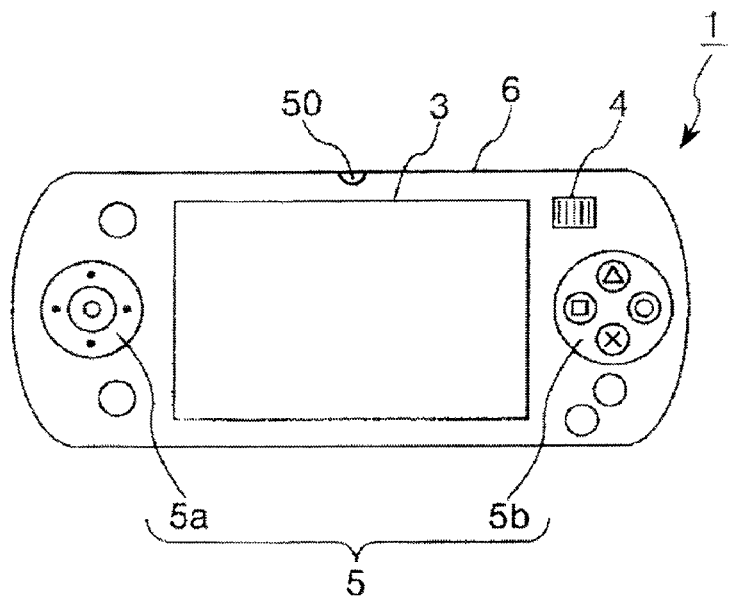
FIGS. 1(a) and 1(b) are block diagrams illustrating the configuration of a video game apparatus according to an embodiment of the present invention.
Figure 1:
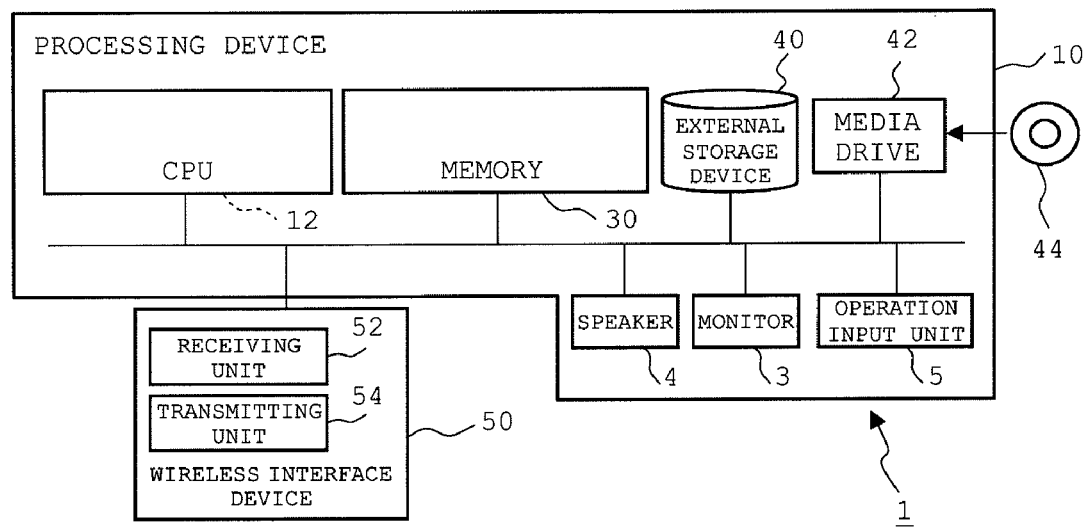

FIG. 1(a) is diagram illustrating an appearance of a portable game apparatus according to this embodiment. As shown in FIG. 1(a), a portable game apparatus 1 is configured with a body 6 provided with an operation inputting unit 5 that has a directional key 5a and an operation key 5b by which a player performs an input operation, a monitor 3 that outputs an image, and a speaker 4 that outputs a voice. A recording medium where a game program is recorded is inserted into the body 6, and the game program is executed by a CPU (Central Processing Unit) that is incorporated in the body 6. Further, an external storage device, such as a memory stick, is inserted into the body 6, and the CPU saves game data or reads out the saved data.

FIG. 1(b) is a block diagram illustrating the functional configuration of a portable game apparatus 1 according to this embodiment. As shown in FIG. 1(b), the portable game apparatus 1 includes a processing device 10 that mainly performs an operation related to an application process and a wireless interface device 50 that performs an operation related to communications. The processing device 10 and the wireless interface device 50 are provided as individual hardwares, and are electrically connected to each other through a bus. Further, the processing device 10 is configured as a host PC and has a function of managing the operation of the wireless interface device 50. The wireless interface device 50 has a dedicated CPU.

The processing device 10 includes a CPU 12, a memory 30, an external storage device 40, a media drive 42, an operation inputting unit 5, a monitor 3, and a speaker 4. The CPU 12 executes a program that is stored in the memory 30 for performing processes shown in a flowchart, which will be described in detail later.

The memory 30 includes a storage area that stores a program executed by the CPU 12 and a work area that stores data temporarily generated when the CPU 12 executes the program. A program for executing the game according to this embodiment is stored in the storage medium 44 and distributed. In the storage area of the program, necessary program modules are divided and loaded by the media drive 42 from the recording medium 44 under the control of the CPU 12 in accordance with a game progress situation.

The operation inputting unit 5 includes a directional key 5a for accepting an operation instruction from a player (used to accept an instruction, such as a movement of a player character) and an operation key 5b (used to accept an instruction, such as an attack of a player character and a selection of a command). The monitor 3 is configured with a liquid crystal panel, for example, and outputs an image, and the speaker 4 outputs a voice. The external storage device 40 is configured as a storage device, such as a memory stick, and used to save or load game data. In the media drive 42, a disc-shaped recording medium 44 is inserted, and a program or data that is recorded in the recording medium 44 is read out. The read out program and data are stored in the memory 30, and used for a process by the CPU 12.

The wireless interface device 50 includes a receiving unit 52 that receives information transmitted from another portable game apparatus 1 and a transmitting unit 54 that transmits information to another portable apparatus 1. The information that is received by the receiving unit 52 is stored in a predetermined area of the memory 30 in the received order under the control of the CPU that is included in the wireless interface device 50. Further, the CPU 12 of the processing device 10 passes information, which needs to be transmitted to another portable game apparatus 1, to the wireless interface device 50. The transmitting unit 54 transmits the information, which is passed from the CPU 12, to another game apparatus 1, under the control of the CPU that is included in the wireless interface device 50.

Next, a three-dimensional video game that is executed by the portable game apparatus 1 will be described. The three-dimensional video game is an action RPG (Role Playing Game). The player progresses the game by operating the operation inputting unit 5, thereby moving a player character that is a main character of the action RPG on a field. It is assumed that the player character that is the main character appears in the entire process of the game and moves on the field. Since the player normally operates the player character that is the main character while progressing the game, the character is called a "normal character".

A plurality of enemy characters are disposed on the field. The player progresses the game by operating the player character and by clearing various missions while bringing down the enemy characters. Further, if the normal character reaches the enemy character with a predetermined distance, the enemy character attacks at the normal character and a battle is started. Except that an operation object of the player is a temporary character, which will be described in detail later, if the enemy character is away from the player character by a predetermined distance (longer than the distance recognized as a start of the battle), it is assumed that the battle is completed. Further, during the battle of the player character and the enemy character, another enemy character that is different from the enemy character that triggers the battle with the player character to start may approach the player character and participate in the battle. In this case, if the player character is also away from such another enemy character by the predetermined distance, it is assumed that the battle is completed.

The battle with the enemy character is developed on the field where the player character has moved (however, there is a limitation in a movable range of the character in the battle with a so-called boss enemy character). The player performs the battle with the enemy character while moving the player character (a normal character and a temporary character that will be described in detail below) on the field in the same way as the case other than the battle. The battle of the player character and the enemy character will be described in detail later.

The field in the three-dimensional virtual space and the player character and non-player characters (including the enemy character) on the field are performed a perspective transformation for every frame (for example, for every 1/30 sec), by means of a virtual camera that is located in the three-dimensional virtual space, and thus an image generated by the virtual camera is displayed on the monitor 3 of the body 6. Further, in the case other than the battle, a position and a direction of a visual point of the virtual camera are controlled in accordance with the movement of the player character (normal character in this case) on the field.

Figure 2:
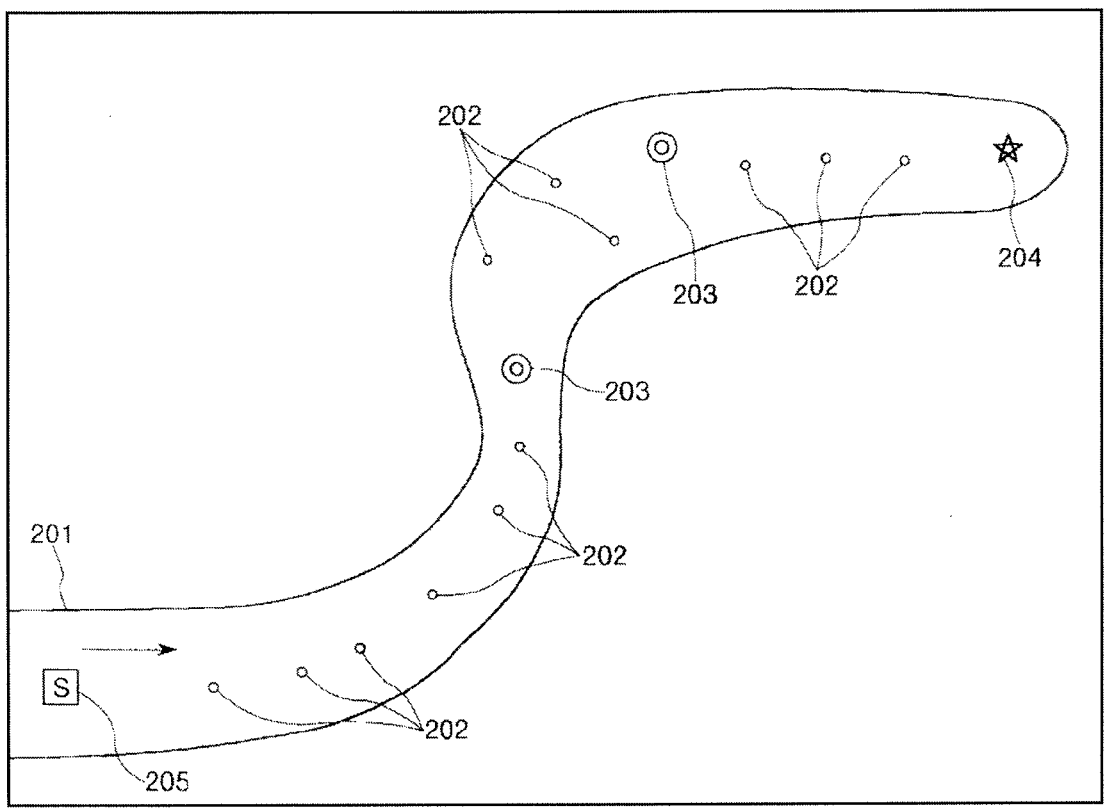
FIG. 2 is a diagram illustrating a field of one stage at a video game according to an embodiment of the present invention.

Hereinafter, the progress situation of the video game according to this embodiment will be described with reference to the accompanying drawings. The video game is composed of a plurality of stages, and the player progresses the game by moving the normal character acting as the player character on the field in each of the stages while having battles with the enemy characters encountering on the field. FIG. 2 schematically shows a field that is adopted in one stage. This field can be displayed on the monitor 3 as a radar map, for example. As a result, the player can progress the game while considering a development of a current stage on the basis of radar map.

In the three-dimensional virtual space, the field is formed. In particular, the normal character can move in a field movable range 201 that is surrounded by a curved line shown in FIG. 2. In the field movable range 201, the normal character is moved while having battles by attacking the enemy character or by dodging an attack by the enemy character to reach the position 204 where the boss enemy character exists.

In FIG. 2, the positions 202 and 203 indicate positions on the field on which the enemy characters other than the boss enemy character are disposed. At each of the positions 202, only the enemy character is disposed. But at each of the positions 203, a non-player character, to which operation object can be temporarily switched from the normal character, is disposed in addition to the enemy character. Since the non-player character is a character that can temporarily be a player character in the battle with the enemy characters, such character is called "temporary character" when switched to be the operation object.

The boss enemy character that will have a battle with the player character at the position 204 is an enemy character that makes the player to have the most difficult battle in the stage as the enemy character has an extraordinary HP (which will be described in detail below), for example. By capturing the battle with the boss enemy character, the corresponding stage is cleared. When the stage is cleared, the player can play the game at a new stage (however, the game is terminated in the case where the final stage is cleared).

In the field movable range 201 shown in FIG. 2, the player first moves the player character (in this case, normal character) heading to the position 204 where the boss enemy character exists with the stage start position 205 shown in a left lower portion as the starting point. The player character heads the position 204 where the boss enemy character exists while having the battle with the enemy characters in the movement course of the field (the character moving on the field is the normal character). However, the player character can freely move in the field movable range 201 to the start position 205, until the battle with the boss enemy character starts. That is, even in the place that the player character passes once, the player character can pass the place without restriction unless special situation arises (such as access way is broken). Once the battle with the boss enemy character starts, the movement range is restricted until the battle is completed, and the player character cannot freely move on the field.

Next, the basic matters of the battle between the player character and the enemy character will be described. In the battle, the player characters (the temporary character may be included) and the enemy characters attack each other. As a result, the respective HPs (Hit Point) of the player characters and the enemy characters are reduced. The HP indicates a life force of each character. If the HP reaches the lower limit value (for example, 0), the character is assumed to be in a battle impossible.

The battle with the boss enemy character is terminated when the boss enemy character or the normal character enters in a battle impossible state. If the normal character that is the main character enters in a battle impossible state, the game is terminated. Here, immediately before the battle with the boss enemy character, an execution state of the game may be saved. When the player character is defeated in the battle with the boss enemy character and the game is terminated, from the saved execution state of the game immediately before the battle with the boss enemy character, the game can be started over. In this case, the player may operate the player character to have the battle with the boss enemy character, or the player may operate the player character to return to a direction toward the start position 205 (may return to reach the start position 205), have battles with other enemy characters and then have the battle with the boss enemy character again.

Further, on the field, in addition to the normal character and the enemy character, a non-player character at a neutral position (which refers to a non-player character other than the enemy characters, and a non-player character used hereinafter does not refer to the enemy character) exists. The non-player character may converse with the player character (normal character), thereby providing information (for example, information related to a weakness of the boss enemy character that appears in the corresponding stage) or an item that can be effectively used to clear a mission of the corresponding stage (win the battle with the boss enemy character) to the player character.

Further, some non-player characters (non-player characters that are disposed at the positions 203 and are other than the enemy character) exist on the field as neutral characters. However, when the battle with the enemy character occurs, the non-player character may be temporarily switched to be a player character (that is, the temporary character described above) on the basis of an instruction to switch of an operation object (to be described later) from the player. Such non-player characters that can be a temporary character may provide information (weakness) of the boss enemy character of the corresponding stage to the player before the player character encounters the non-player character.

The attacks of the player character (including the temporary character) in the battle includes an attack that gives a physical damage using a weapon in addition to an unscientific attack (so-called attack magic) utilizing a special ability that the player character has. It is assumed that the attack utilizing the special ability shows a significant effect with respect to the specific enemy character (including the boss enemy character). For example, when there is magic that generates a snowstorm to make the enemy character frozen into ice as the attack utilizing the special ability, if the magic that generates the snowstorm is used against the enemy character that is weak to the cold, it is possible to further decrease the HP of the enemy character. Further, examples of the special ability other than the attack magic may include recovery magic that increases a value of the decreased HP and status magic for stopping the motion of the enemy character for a predetermined time or for speeding up the self motion for a predetermined time.

The action (the movement, the attack, and the utilization of the special ability) of the player character (the normal character or the temporary character at the time when the operation object is switched) can be appropriately made in accordance with an instruction of the action from the player. Further, it is assumed that the enemy character also arbitrarily moves on the field (the movable range is defined for every enemy character), and appropriately attacks the player character, when the distance with the player character is within a certain distance. Further, it is assumed that the attack effects (effectiveness/ineffectiveness of the attack and the amount of reduced HP of the attacked character) with respect to the player character and the enemy character are different in accordance with the positional relationship between the player character and the enemy character. That is, assuming that other elements are the same, the attack effects more when the attack is made from the closer position and the attack is made from the back side.

Here, an instruction to switch of an operation object by the player will be described. A level that indicates a proficiency degree of the player character (normal character) is increased whenever an experimental value obtained by winning the battle reaches a predetermined value. In the case where there is the non-player character that can be the temporally character, when a level of the normal character exceeds the level of the corresponding non-player character (predetermined level), the player can switch the operation object to the non-player character, that is, the instruction to switch of the operation object, and the player can operate the non-player character as the player character (temporary character), instead of the normal character.

However, the non-player character that can be an operation object (that is, temporary character) is restricted to a character that is located within the predetermined distance from the normal character, and can enter into a range of a view field of the normal character (that is, an obstacle does not exist between the normal character and the non-player character). The instruction to switch of the operation object will be described in detail later. Further, the time allowing setting the non-player character as the temporary character is limited within a predetermined restriction time after the battle starts or the non-player character enters into the view field.

When the operation object of the player is the temporary character, if the HP of the corresponding temporary character reaches 0 and the corresponding temporary character enters in a battle disable state, then the operation object is compulsorily switched back to the normal character (in this case, the HP and the special ability are not inherited by the normal character). Further, the operation object may be switched back from the temporary character to the normal character when a certain time elapses (which will be described in detail later). If the operation object is switched back to the normal character, the temporary character that has been the operation object disappears from the field. The non-player character that is not the operation object as the temporary character may be returned to the position when the instruction to switch of the operation object is performed.

When the player character (the normal character and the temporary character) repeatedly has battles with the enemy characters, the level of the normal character increases and the maximum value of the HP increases in accordance with the increase in the level. Meanwhile, in accordance with the operation object switching to the non-player character to be the temporary character, the HP of the temporary character varies by reflecting the HP of the normal character on the original HP of the temporary character (however, only when the HP of the normal character is higher than the HP of the normal character).

Further, if the temporary character which is the operation object has a special ability, the player can utilize the special ability while the operation object is switched. At the same time when the operation object is switched back to the original normal character, the HP of the temporary character and the special ability used during the operation of the temporary character are inherited by the normal character (however, the HP is inherited only when the HP of the temporary character at the time of being switched back to the original normal character is higher than the HP of the normal character). Here, the normal character does not have any special ability when the game starts.

However, in this example, in the battle where a plurality of non-player characters may be the operation object as the temporary character, the HP and the special ability can be inherited by the normal character is made only once with respect to only the temporary character that is firstly switched to be the operation object. Further, the special ability cannot be inherited if the special ability is not used at least once during the operation of the temporary character. Further, if the non-player character has a plurality of special abilities and the temporary character is set to the non-player character as the operation object by switching, the plurality of special abilities can be utilized. However, it is assumed that the special ability inherited to the normal character is only the special ability that is firstly used (obviously, it can be assumed that all of the (utilized) special abilities may be inherited).

The HP of the non-player character that is the operation object as the temporary character is inherited by the normal character by adding up to the predetermined amount (a constant value or a constant ratio) of the HP of the corresponding non-player character to the HP of the normal character. Further, the amount of HP of the temporary character inherited by the normal character may be determined in accordance with the amount of the HP of the temporary character immediately before the operation object is switched back to the normal character.

Figure 3:
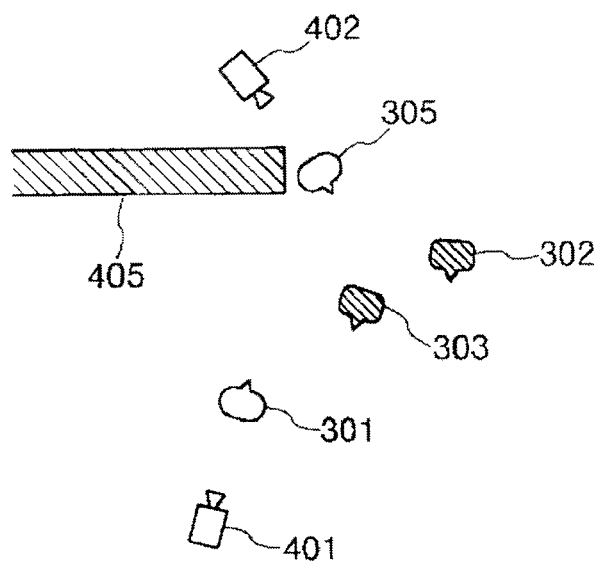
FIGS. 3(a) to 3(c) are diagrams illustrating usability when a character to be an operation object is switched from a normal character to a temporary character.
Figure 3:
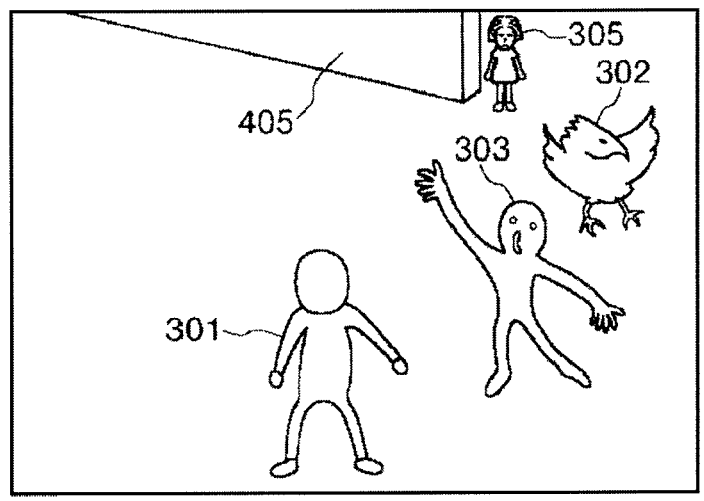
Figure 3:
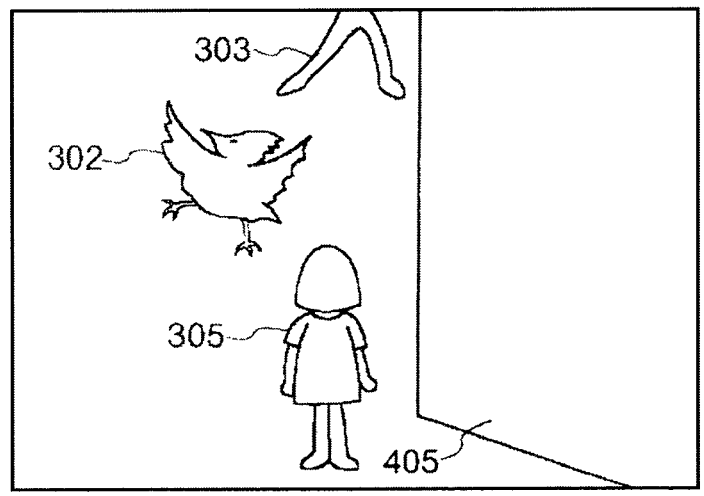

Here, an example of the progress of the battle using the operation object switching will be described. First, usability of switching the player character to be the operation object in the battle from the normal character to the temporary character will be described using FIG. 3. The usability of the switching from the normal character to the temporary character includes that the special ability of the temporary character that the normal character does not have can be utilized and the ability of the non-player character that becomes the temporary character can be inherited when the player character that is the operation object is switched back to the normal character. However, usability that is caused by the positional relationship between the individual characters will be described below.

FIGS. 3(a) to 3(c) are diagrams illustrating usability of switching a player character that is an operation object from a normal character to a temporary character with a positional relationship between individual characters. Specially, FIG. 3(a) shows a positional relationship between individual characters and a virtual camera when a battle occurs, FIG. 3(b) shows a screen of a game when a normal character is used as an operation object with the positional relationship shown in FIG. 3(a), and FIG. 3(c) shows a screen of a game when a temporary character is used as an operation object.

The screen during the game is controlled while the player character that the player uses as the operation object is set in the center, so that the player easily enters in the game world. That is, the position of the visual point of the virtual camera is set to become the position of the constant distance from the back side of the player character, and a direction of a visual axis is also set in accordance with a direction of the player character that is the operation object (However, when the position and/or the direction of the player character varies, there may be a time lag may until the position of the visual point and the direction of the visual axis of the virtual camera is adjusted in accordance with the variation in the position and/or the direction of the player character).

In all of the characters during the game, the coordinate positions are defined as the coordinates of (x, y) (or (x, y, z)). The position of the camera is similarly defined as these coordinates, and is always controlled in association with the position of the player character. Accordingly, when the player character is switched from the normal character to the temporary character by the operation object switching, the position of the visual point and the direction of the visual axis of the virtual camera are also adjusted in accordance with the position and the direction of the temporary character when it is recognized that the operation object is switched.

For example, the case where the normal character 301, the enemy characters 302 and 303, and the non-player character 305 (temporary character when the non-player character 305 is the operation object) that can be the temporary character are disposed as shown in FIG. 3(a) in the field where an obstacle 405, such as a wall, is formed is considered. While the operation object is the normal character 301, an image shown in FIG. 3(b) that is viewed from the virtual camera 401 in accordance with the position and the direction of the normal character 301 is displayed on the monitor 3. If the operation object is switched to the temporary character 305 by the operation object switching, an image shown in FIG. 3(c) that is viewed from the virtual camera 402 in accordance with the position and the direction of the temporary character 305 is displayed on the monitor 3.

As can be seen from FIG. 3(c), for example, when the player is planning to attack the enemy character 302, the player character can dodge the enemy character 303 and sneak around to the back of the enemy character 302 by switching the operation object into the non-player character 305 that can be the temporary character. Therefore, the player can perform the battle at a very advantageous position. As such, in this example, it is very important to determine to switch the operation object into the non-player character at which position. In order to most effectively progress the battle, the player needs to consider, to which non-player character (that can be a temporary character), the operation object is switched. Therefore, it is possible to enhance amusement.

Figure 4:
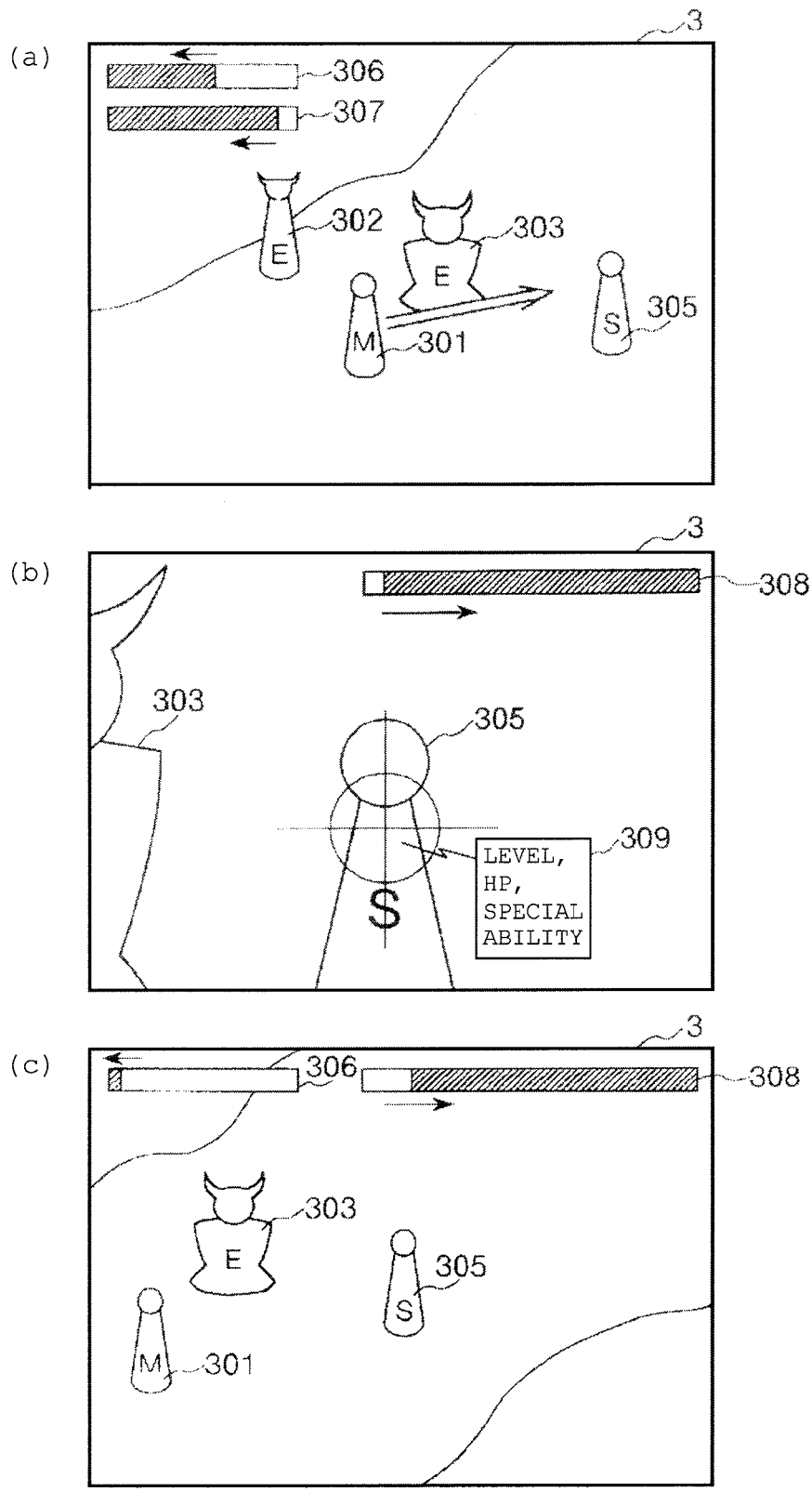
FIGS. 4(a) to 4(c) are diagrams illustrating a transition of a display screen when an operation object is switched at the time of a battle.

Next, switching of the operation object from the normal character to the non-player character that can be the temporary character will be described using FIGS. 4(a), 4(b), and 4(c).

FIG. 4(a) shows a screen when a normal character 301 is the operation object, which exemplifies a display screen when a battle starts. At this point of time, the player character to be the operation object is the normal character 301. In the upper left portion of the screen that is displayed on the monitor 3, an HP gauge 306 that indicates a current HP of the normal character 301, and an operation object switching allowing gauge 307 that indicates a elapsing situation of a restriction time where the player can instruct switching of the operation object from the normal character to the non-player character that can be the temporary character are shown.

In regards to the gauge, a shaded portion of the switching gauge is decreased from a right direction to a left direction, in accordance with a reduction in HP or a reduction in restriction time allowing for switching the operation object. While the operation object switching allowing gauge 307 does not reach to zero, the player can instruct to switch the operation object.

In the display screen when the battle starts shown in FIG. 4(a), if the player operates the operation inputting unit 5 to instruct the operation object switching with respect to the player character, first, the screen that is displayed on the monitor 3 is changed to the operation object switchable mode screen shown in FIG. 4(b). The operation object switchable mode screen is generated while performed a perspective transformation from the position of the normal character 301 in FIG. 4(a) by the subject visual point of the normal character 301 (the position of the visual point of the virtual camera being at the position of eyes of the normal character 301).

For the non-player character that becomes a target of the operation object switching (non-player character that can be the temporary character), the non-player character existing at a position closest to the normal character 301 is automatically targeted out of the non-player characters that can be the temporary characters existing at the position within the view field of the normal character 301 when the instruction of the operation object switching is made. However, when there are a plurality of non-player characters that can be the temporary characters, the non-player characters that become the targets of the operation object switching are sequentially switched in accordance with the operation from the directional key 5a by the player.

Specifically, target is changed to the non-player character that exists at a position secondly close to the normal character next to the non-player character as the current target if an upward directional key is operated, changed to the non-player character that exists at a position secondly far from the normal character next to the non-player character as the current target if a downward directional key is operated, changed to the non-player character that exists at the right side of the non-player character as the current target if a rightward directional key is operated, and changed to the non-player character that exists at the left side of the non-player character as the current target if a leftward directional key is operated.

As such, in the operation object switchable mode, since the directional key 5a is used to switch the non-player character that becomes the target, the operation object at the corresponding point of time is still the normal character 301, but the normal character 301 can not be moved on the field. Since the input other than the directional key 5a is effective, the normal character 301 can take an action other than the movement.

In the operation object switchable mode screen that is shown in FIG. 4(b), a status window 309 that displays a status of the non-player character 305 as the target is displayed. In the status window 309, in addition to information related to a name or occupation set to the corresponding non-player character 305, the level and the HP of the non-player character 305, existence or non-existence of the special ability and a content of the special ability if the special ability exists, are displayed.

If the level of the non-player character 305 that becomes the target does not exceed the level of the normal character 301, the player can switch the operation object into the non-player character 305 by instructing of the operation object switching. If the level of the non-player character 305 that becomes the target exceeds the level of the normal character 301, it is not possible to switch the operation object into the corresponding non-player character 305. In this case, in the status window 309, a message, such as "Error" or "Unknown", which tells the player that the corresponding non-player character 305 cannot become the operation object, is displayed.

Further, even when the level of the non-player character 305 that becomes the target does not exceed the level of the normal character 301 that is currently operated by the player, the non-player character which HP becomes zero is regarded as the dead character, and the operation object switching may not be performed.

Further, in the operation object switchable mode screen that is shown in FIG. 4(b), at the upper right portion thereof, an operation object switching time gauge 308 that indicates a time elapsing situation of a period until the operation object is determined in the operation object switchable mode and a period during which the operation object is switched is shown. In the operation object switching time gauge 308, a shaded portion of the gauge is decreased as the time elapses during the period until the operation object is determined in the operation object switchable mode (and during a period where the temporary character 305 can be operated after the operation object is switched, as will be described in detail below).

Further, in the operation object switchable mode, if the operation object is not switched into the non-player character that can be the temporary character until the shaded portion of the operation object switching time gauge 308 completely disappears, the operation object switchable mode is finished. Further, after the temporary character 305 is used as the operation object as described later, when the shaded portion completely disappears, the operation object is switched back to the normal character 301.

When the operation object switchable mode screen shown in FIG. 4(b) is displayed, if the operation object switching is instructed by the operation of the operation inputting unit 5 from the player, the player character that becomes the operation object is switched into the non-player character 305 that is set as the target. Further, the screen that is displayed on the monitor 3 is switched into the temporary character operation screen shown in FIG. 4(c). Further, when the screen is switched, a special effect that the operation object switchable mode screen whites out from the monitor 3 and is not displayed, then, the character operation screen whites in and is displayed on the monitor 3, or that a blur (special effect to intentionally making residual images) is adopted on the entire screen, can be performed.

In the temporary character operation object screen shown in FIG. 4(c), the temporary character 305 is switched to be the player character that becomes the operation object, an operation object switching gauge 308 is shown, and a shaded portion of the gauge is decreased as the time elapses. Further, the amount of the operation object switching gauge 308 is continuously decreased in the operation object switchable mode screen and the temporary character operation screen. If the time until the instruction to switch the operation object into the temporary character is input in the operation object switchable mode screen is long, the time where the temporary character 305 can be set as the operation object in the temporary character operation object screen is decreased.

Figures 5, 6:
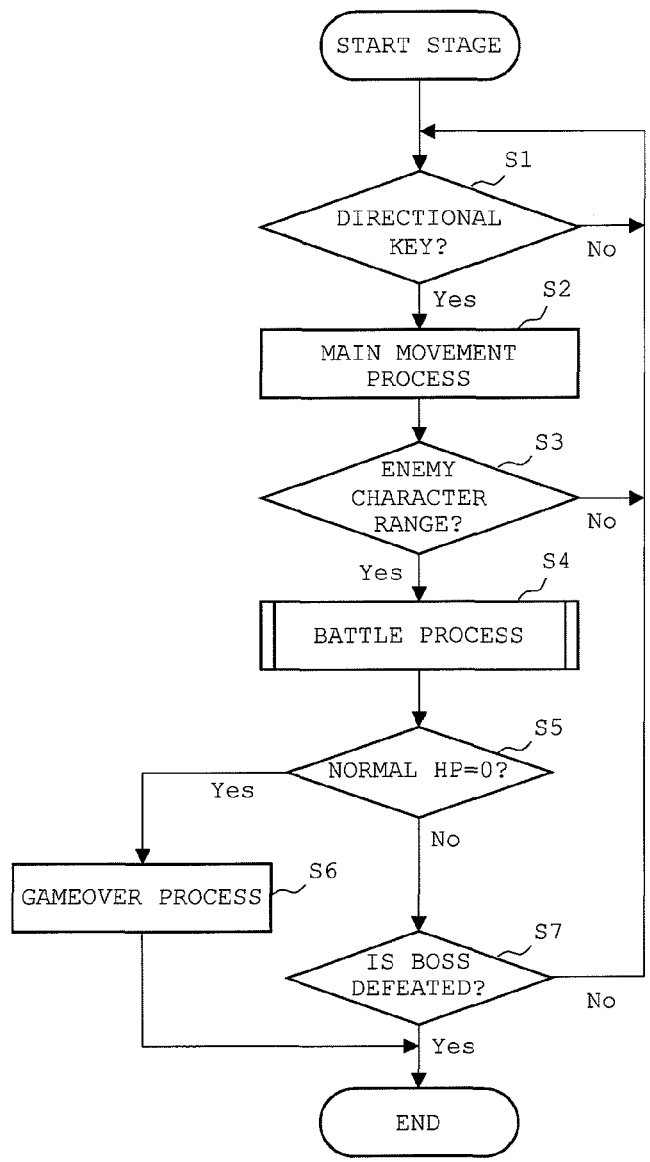
FIG. 5 is a diagram illustrating the inheritance of an HP and a special ability of a non-player character set as a temporary character by a normal character.
FIG. 6 is a flowchart illustrating a process in a field of one stage.

FIG. 5 is a diagram illustrating the inheritance of an HP and a special ability from a non-player character as a temporary character to a normal character. As shown in FIG. 5, it is assumed that the normal character 301 immediately before the operation object is switched has a level of 5, an HP of 500, and special abilities of a "fire" and "cure". Further, it is assumed that the temporary character 305 switched to be the operation object immediately before the operation object is switched back to the normal character 301 has the level of 4, an HP of 700, and special ability of "blizzard". Further, a level of the normal character 301 in the above case is higher than a level of the temporary character 305. Accordingly, it can be seen that switching of the operation object is able to be performed.

When the operation object is switched back from the temporary character 305 to the normal character 301, either the HP and the special ability of the temporary character 305 immediately before the switching, or the HP and the special ability of the normal character 301 immediately before the operation object is switched into the temporary character 305 is not used as it is for the HP and the special ability of the normal character 301. In particular, the HP of the normal character 301 that is switched back to the operation object is determined by calculating using the HPs of both the normal character 301 and the temporary character 305.

In the example shown in FIG. 5, the level of the normal character 301 that is switched back to the operation object has 5, which is equal to the level immediately before the operation object is switched into the temporary character 305. The reason is that the level is not inherited. In regards to the HP, the HP (500) of the normal character 301 immediately before the operation object is switched into the temporary character 305 is lower than the HP (700) of the temporary character 305 immediately before the operation object is switched back to the normal character 301, the HP of the normal character 301 that is switched back as the operation object becomes 600 that is an intermediate value between the HPs.

In regards to the special ability, the normal character 301 immediately before the operation object is switched into the temporary character 305 does not have the "blizzard". However, when the temporary character 305 becomes an operation object, if the "blizzard" that the temporary character 305 has is used, the "blizzard" that the temporary character 305 has is inherited by the normal character 301 after being switched back to be the operation object and the normal character 301 has the "blizzard".

Further, when the player switches the operation object from the normal character 301 to the temporary character 305, the HP is inherited by the temporary character 305 from the normal character 301, in the same way as the case where the operation object is switched back from the temporary character 305 to the normal character 301.

Next, a main process in the video game according to this embodiment is shown using a flowchart. FIG. 6 is a flowchart illustrating a process on one stage of a video game according to this embodiment, and FIG. 7 is a flowchart illustrating a battle process on one stage.

First, in the flowchart shown in FIG. 6, the CPU 12 determines whether an input (movement input) of the directional key 5a from the player is made (Step S1). When it is determined that the input of the directional key 5a is made, the CPU 12 moves the position of the normal character on the field in accordance with the input (Step S2). When it is determined that the input of the directional key 5a is not made, the movement of the normal character is not made, and the CPU 12 determines whether the input of the directional key 5a is made again in Step S1.

In Step S2, if the position of the normal character is moved, the CPU 12 determines whether the moved position of the normal character is within a range that is subjected to the attack of the enemy character (Step S3). When it is determined that the moved position of the normal character is not within the range that is subjected to the attack of the enemy character, the CPU 12 determines whether the movement input from the player is made again in Step S1. When it is determined that the moved position of the normal character is within the range that is subjected to the attack of the enemy character, the battle with the corresponding enemy character starts. The CPU 12 executes the battle process (refer to FIGS. 7A and 7B) that will be described in detail below (Step S4). Further, the battle process is completed when the enemy character that is currently the battle object enters in a battle disable state, the normal character enters in a battle disable state, or the distance between the player character (the normal character and the temporary character during the operation) and the enemy character (including an enemy character different from the enemy character that becomes the moment of the battle start) becomes the predetermined distance or more.

When returned from the battle process, the CPU 12 determines whether the battle is completed because of the normal character entering in a battle disable state (Step S5). If the battle is completed because of the normal character entering in the battle disable state, the CPU 12 executes a gameover process (Step S6). If the battle is not completed because of the normal character entering in the battle disable state, the CPU 12 determines whether the battle is completed because of the boss enemy character entering in the battle disable state (Step S7). If the battle is completed because of the boss enemy character entering in the battle disable state, the CPU 12 completes a process on the corresponding stage. If the battle is not completed because of the boss enemy character entering in the battle disable state, the CPU 12 determines whether the movement input from the player is made again in Step S1.

Figure 7A:
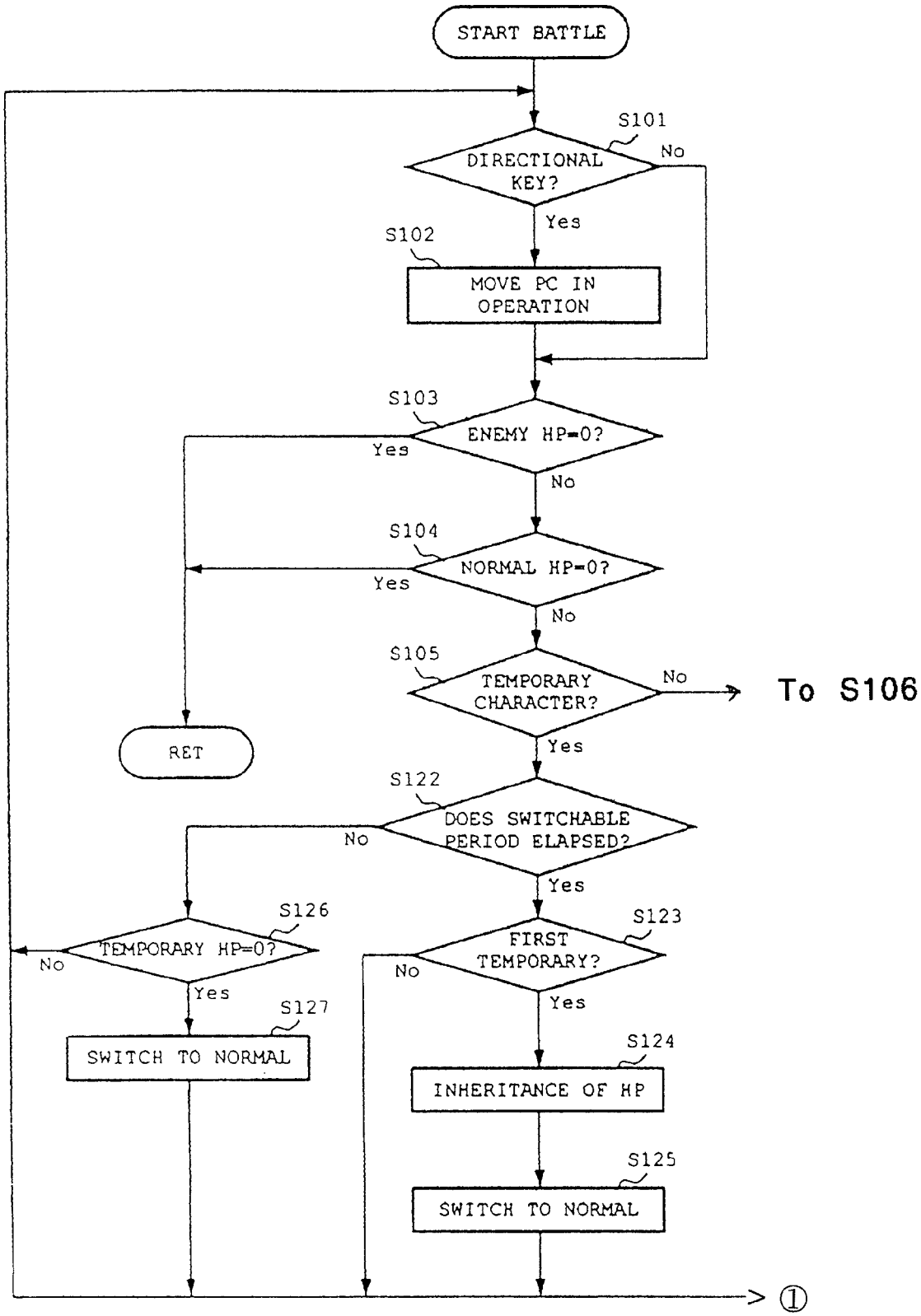
FIGS. 7A and 7B are flowcharts illustrating a process in a battle.
Figure 7B:
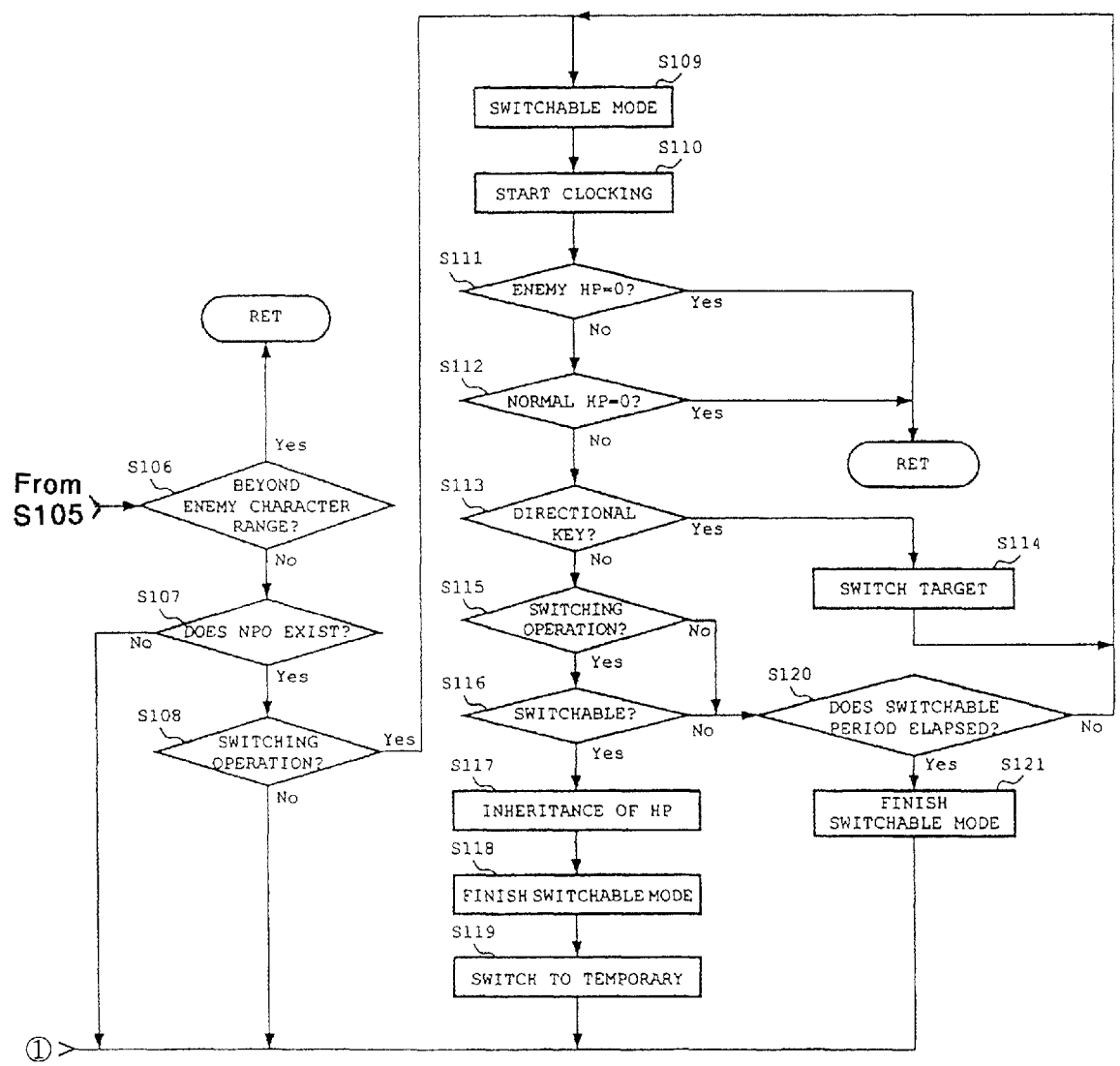

FIGS. 7A and 7B are flowcharts specifically illustrating a battle process in Step S4. Although not shown in the flowcharts of FIGS. 7A and 7B, during the battle process, the player can input the instruction of the action (the attack except for the movement and utilization of the special ability) with respect to the player character (the normal character or the temporary character) that is currently the operation object at any time. In accordance with the instruction, the player character can take the action at any time, during the battle. Further, the enemy character also appropriately performs the action, under the control of the CPU 12. In addition, as the result of the action, the parameter or the status, such as the HP of the player character and/or the enemy character, is varied. Further, the control of the battle process includes the control of the operation object switchable mode. However, in the battle where the non-player character that can be the temporary character does not exist, the control of the operation object switchable mode is not performed.

During the battle process, the CPU 12 determines whether the input of the directional key 5a is made (Step S101). If the input of the directional key 5a is made, the CPU 12 moves the position of the player character (the normal character or the temporary character) on the field that is currently the operation object at the current point of time, in accordance with the corresponding input of the directional key 5a (Step S102). In addition, the procedure proceeds to the process of Step S103. If the input of the directional key 5a is not made, the procedure proceeds to the process of Step S103.

In Step S103, the CPU 12 determines whether HPs of all of the enemy characters participating in the battle become 0, as the result of the action of the player character and/or the enemy character. If the HPs of all of the enemy characters do not become 0, the CPU 12 determines whether an HP of the normal character becomes 0 (Step S104). If the HPs of all of the enemy characters become 0 or the HP of the normal character becomes 0, the battle process is completed and the procedure is returned to the flowchart shown in FIG. 6.

If the HP of the normal character does not become 0, the CPU 12 determines whether the player character that is currently the operation object is the temporary character (Step S105). If the player character is not the temporary character, the CPU 12 determines whether the enemy character exists in a range where the distance from the normal character is not determined as the completion of the battle (Step S106). If there is no enemy character in the range where the distance from the normal character is not determined as the completion of the battle, the CPU 12 completes the battle process and the procedure is returned to the flowchart shown in FIG. 6.

If at least one enemy character exists in the range where the distance from the normal character is not determined as the completion of the battle, the CPU 12 determines whether a non-player character that can be the temporary character exists (Step S107). If the non-player character that can be the temporary character does not exist, the procedure is returned to the process of Step S101. If the non-player character that can be the temporary character exists, the CPU 12 determines whether the player inputs the instruction to switch the operation object (Step S108). If the player does not input the instruction to switch the operation object, the procedure is returned to the process of Step S101.

If the player inputs the instruction to switch the operation object, the CPU 12 sets the mode to the operation object switchable mode. Specifically, the CPU 12 moves the position of the visual point of the virtual camera to the position of the eyes of the normal character, orients the visual axis to the non-player character that exists at the position closest to the normal character among the non-player characters that can be the temporary characters, and makes the closest non-player character targeted for the operation object switching. In this case, information that is related to the non-player character that becomes the target is displayed on the status window 309 (Step S109). Further, the CPU 12 starts counting of an operation object switchable period (Step S110).

Next, the CPU 12 determines whether HPs of all of the enemy characters participating into the battle become 0, as the result of the action of the player character and/or the enemy character (Step S111). If the HPs of all of the enemy characters do not become 0, the CPU 12 determines whether an HP of the normal character becomes 0 (Step S112). If the HPs of all of the enemy characters become 0 or the HP of the normal character becomes 0, the CPU 12 completes the battle process and returns the procedure to the flowchart shown in FIG. 6.

If the HP of the normal character does not become 0, the CPU 12 determines whether an input of the directional key 5a is made (Step S101). When it is determined that the input of the directional key 5a is made, the CPU 12 switches the non-player character to be the target of the operation object switching in accordance with the input. In this case, information of the non-player character that newly becomes the target is displayed on the status window 309. Further, if the number of non-player characters that can be the temporary character is only one, the target switching is not performed and the input from the directional key 5a becomes invalid (Step S114). In addition, the CPU 12 returns the procedure to the process of Step S109.

When it is determined that the input of the directional key 5a is not made, the CPU 12 determines whether an instruction to switch the player character to be the operation object by the player into the non-player character that is currently the target is input (Step S115). If the instruction to switch the player character to be the operation object is not input, the procedure proceeds to the process of Step S120.

If the instruction to switch the player character to be the operation object is input, the CPU 12 determines whether the non-player character that is currently the target can be switched to be the operation object. In this case, when the level of the normal character is not lower than the level of the non-player character that is currently the target and the non-player character that is currently the target exists within a range of the predetermined distance from the normal character, the CPU 12 determines that the non-player character that is currently the target can be switched to be the operation object (Step S116). If the non-player character that is currently the target cannot be switched to be the operation object, the procedure proceeds to the process of Step S120.

When the non-player character that is currently the target can be switched to be the operation object, the CPU 12 causes the temporary character to inherit the HP if the HP of the non-player character that is currently the target is smaller than the HP of the normal character (Step S117). In addition, the CPU 12 completes the operation object switchable mode (Step S118). At this time, an image that is displayed on the monitor 3 whites out.

Next, the CPU 12 sets the non-player character that has been the target as the temporary character to be the operation object of the player. At this time, the position of the visual point and the direction of the visual direction of the virtual camera are controlled in accordance with the temporary character set as the operation object. At this time, on the monitor, an image whites in and is displayed (Step S119). In addition, the procedure is returned to the process of Step S101.

In Step S120, the CPU 12 determines whether the time that is counted starting in Step S110 elapsed the time period allowing for the operation object to be switched into the temporary character. If the time period allowing for the operation object to be switched into the temporary character is not elapsed, the procedure is returned to the process of Step S109. If time period allowing for the operation object to be switched into the temporary character is elapsed, the CPU 12 completes the operation object switchable mode, and controls the position of the visual point and the direction of the visual axis of the virtual camera in accordance with the normal character (Step S121). In addition, the procedure is returned to the process of Step S121.

Further, when the operation object becomes the temporary character in Step S105, the CPU 12 determines whether the time that is counted starting in Step S110 elapses the time period for allowing the operation object to be switched into the temporary character (Step S122). When time period allowing for the operation object to be switched into the temporary character is elapsed, the CPU 12 determines whether the temporary character used as the operation object until now becomes the first operation object at the current battle (Step S123). If the temporary character used as the operation object until now does not become the first operation object, the procedure is returned to the process of Step S101.

If the temporary character used as the operation object until now becomes the first operation object, the CPU 12 causes the normal character to inherit the HP, if the HP of the non-player character as the temporary character exceeds the HP of the normal character. In addition, when the special ability of the temporary character that has been the operation object is used and the normal character does not have the special ability that is firstly used, the CPU 12 causes the normal character to inherit the special ability (Step S124). Next, the CPU 12 sets the operation object of the player as the normal character. At this time, the position of the visual point and the direction of the visual axis of the virtual camera are controlled in accordance with the normal character set as the operation object (Step S125). In addition, the procedure is returned to the process of Step S101.

In Step S122, if time period allowing for the operation object to be switched into the temporary character is not elapsed, the CPU 12 determines whether the HP of the temporary character that is currently the operation object becomes 0 (Step S126). If the HP of the temporary character does not become 0, the procedure is returned to the process of Step S101. If the HP of the temporary character becomes 0, the CPU 12 sets the operation object of the player as the normal character. At this time, the position of the visual point and the direction of the visual axis of the virtual camera are controlled in accordance with the normal character set as the operation object (Step S127). In this case, the normal character does not inherit the HP or the like. In addition, the procedure is returned to the process of Step S101.

As described above, the game is progressed while the player character (normal character) is moved on the field. The enemy characters are disposed here and there on the field. If the normal character approaches within the range of the predetermined distance with the enemy character, the enemy character attacks the normal character and the battle starts. Further, the non-player characters at the neutral position also exist on the field. However, a portion of the non-player characters may be temporarily switched from the normal character in accordance with the instruction from the player and become the operation object (that is, it becomes the temporary character).

In the battle where the non-player character that can be the temporary character appears, the player can switch the operation object from the normal character to the non-player character to be the corresponding temporary character. By operating the temporary character that becomes the player character by switching the operation object, it is possible to perform the battle with the enemy character. At this battle, if the character to be the operation object is switched from the normal character to the non-player character that can be the temporary character, the HP and the special ability of the non-player character that becomes the temporary character are inherited by the normal character.

The HP and the special ability of the normal character that are updated by inheriting the HP and the special ability of the non-player character that becomes the temporary character are not returned to the original HP and special ability, even when the battle is completed and thus, the game is continuously played with the updated HP and the special ability. That is, if the HP and the special ability of the normal character are updated by inheriting the HP and the special ability of the non-player character that becomes the temporary character, this affects a game (including the battle with the boss enemy character) that is played by progressing with the normal character thereafter.

As such, a game element that is generated by switching the character to be the operation object from the normal character to the temporary character in the battle where the non-player character that can be the temporary character exists is not completed during the corresponding battle, but affects the progress of a game thereafter. Therefore, the player can perform a game while enjoying the switching of the character as an amusement of the entire game progress.

Further, since an ability (in particular, special ability) of the temporary character that is switched to be the operation object reflects on an ability of the normal character when a game is progressed thereafter, when the character to be the operation object is switched into the temporary character, the player feels as if the non-player character that becomes the temporary character is possessed by the normal character. Accordingly, it is possible to increase an amusement of the game.

All amount of the HP is not necessarily inherited by the normal character from the temporary character switched to be the operation object but within the predetermined amount of the HP is inherited. Therefore, if the operation object is switched from the normal character to the temporary character, the HP of the normal character is not excessively increased. Alternatively, there is no case in which the HP of the non-player character that becomes the temporary character is substantially restricted in order not to excessively increase the HP of the normal character.

Further, the HP and the special ability is not inherited by the normal character from the non-player character that becomes the temporary character only by switching the temporary character into the operation object. The HP and the special ability are not inherited unless operating the temporary character switched to be the operation object. In particular, the special ability is not inherited by the normal character unless the special ability is used by the temporary character that becomes the operation object. Therefore, when the non-player character that becomes the temporary character is possessed by the normal character and is operated, the player feels that the normal character gains the ability of the non-player character that becomes the temporary character. Therefore, it is possible to increase an amusement of the game.

Meanwhile, even though the temporary character that becomes the operation object has special abilities of plural kinds, only an ability of one kind that is first used by the temporary character is inherited by the normal character. Therefore, the special abilities that the temporary character has cannot be infinitely gained by the normal character, and the selection of the kind of the special ability that is first used when the temporary character is switched to be the operation object affects the progress of the game thereafter. Therefore, a strategic characteristic of the game can be improved.

In order to switch the character to be the operation object from the normal character to the non-player character that can be the temporary character, the level of the normal character should become higher than the level of the non-player character. As such, since switching of the operation object into the temporary character is not performed without limitation, even in the battle where the non-player character that can be the temporary character exists, the player is interested in whether the operation object can be switched or when the operation object can be switched. Therefore, an amusement of the game can be increased.

Further, in the battle that the non-player character that becomes the temporary character exists, in order to switch the character to be the operation object from the normal character to the corresponding non-player character, the player should change the mode to the operation object switchable mode, by selection of the action of the normal character. In the operation object switchable mode, the normal character cannot move on the field. Even in this case, the enemy character can attack the normal character.

That is, in the operation object switchable mode, the player is in danger because the normal character is difficult to avoid the attack from the enemy character. Therefore, if the mode is changed to the operation object switchable mode, it is preferable to switch the operation object quickly into the non-player character that can be the temporary character. Therefore, more time restriction than the predetermined time restriction, which is originally defined for switching the character to be the operation object of the player from the normal character to the non-player character that can be the temporary character, is psychologically applied to the player. Thus, it is possible to increase the amusement when the character to be the operation object in the battle is switched.

Further, in the operation object switchable mode, the operation object can be switched to the non-player character that can be the temporary character within the time until the operation object switching time gauge 308 is filled. Here, the time in which the temporary character switched to be the operation object can be operated is restricted in time until the operation object switching time gauge 308, which continuingly extends, is filled. Therefore, with respect to the switching from the normal character to the temporary character, the psychological time restriction can be applied to the player. Accordingly, it is possible to increase an amusement when the character to be the operation object in the battle is switched.

Meanwhile, in the operation object switchable mode, the operation object switchable mode screen that is displayed on the monitor 3 becomes a screen that is performed a perspective transformation by the subject visual point of the normal character and generated. Therefore, the player can have an impression that the player becomes the normal character and searches the non-player character to be the switching destination as the operation object, from the screen displayed on the monitor 3. Accordingly, it is possible to increase realistic sensation of the game.

Further, in the operation object switchable mode, if the player operates the operation inputting unit 5 and instructs to switch the operation object into the non-player character that can be the temporary character, a special effect is embodied. For example, after the screen shown in FIG. 4(*b*) whites out, the screen shown in FIG. 4(*c*) whites in and is displayed on the monitor 3. Thereby, it is possible to alleviate a sense of incongruity which the player feels when the position of the visual point of the virtual camera is rapidly changed. Further, an unreal visual effect in the virtual world (for example, from an image that is displayed on the monitor 3, an impression that the switching of the operation object from the normal character to the non-player character that can be the temporary character is a special phenomenon such as a psychic phenomenon is applied to the player) can be given to the player. In addition, an amusement of the game is increased and realistic sensation can be increased.

Further, when the character to be the operation object of the player is switched from the normal character to the temporary character, an HP that is obtained by reflecting the HP of the normal character is used as the HP of the temporary character. Therefore, the player feels that the temporary character is possessed by the normal character when the character to be the operation object is switched into the temporary character, in contrast as the case of the inheritance of the HP of the temporary character to the normal character. Accordingly, an amusement of the game can be increased.

Further, in the battle, a plurality of non-player characters each of which becomes the temporary character that can be switched from the normal character as the operation object may exist. In this case, with respect to each of the non-player characters that become the temporary character, an HP or a special ability may be different. However, with respect to any non-player character that becomes the temporary character, switching as the operation object is not restricted. That is, all of the non-player characters that become the temporary character can be sequentially switched to be the operation object, until the battle is completed.

However, even in the case where a plurality of non-player characters that can be switched from the normal character as the operation object exist until the battle is completed, the HP or the like of only the non-player character that is firstly switched as the temporary character is inherited by the normal character. Therefore, not only the fact that the character to be the operation object is switched into the non-player character that can be the temporary character, but also the fact, into which non-player character that can be the temporary character, the character to be the operation object is switched affects the progress of the game thereafter. Thereby, a strategic characteristic of the game is further improved.

Further, one stage is cleared when the player wins the battle with the boss enemy character. However, a weakness is set to the boss enemy character that appears in this case. If the normal character gains the special ability that corresponds to the weakness of the boss enemy character, the normal character exercises the special ability and a damage that is applied to the boss enemy character increases. Therefore, it is possible to relatively easily perform the battle with the boss enemy character. This special ability can be gained by switching the operation object into the temporary character before the battle with the boss enemy character.

Therefore, even when performing the battle with the enemy character other than the boss enemy character, the player considers how to win the battle with the enemy character performed at the current point of time and how to win the battle with the boss enemy character generated in the future progress of the game, and needs to perform the battle where the non-player character that can be the temporary character appears. As a result, a strategic characteristic of the game is further improved.

The present invention is not limited to the above-described embodiment and various modifications and applications can be made. Hereinafter, the medications in the embodiment that can be applied to the present invention will be described.

In the above embodiment, if only one player character (normal character) moves on the field, the game other than the battle is progressed. However, if the party of the plurality of player characters move on the field, the game other than the battle may be progressed. In this case, each of the plurality of player characters that constitute the party corresponds to the normal character. In addition, all of the plurality of player characters that are constituent members of the party may participate in the battle with the enemy character.

In this case, the player performs the battle with the enemy character while switching the operation object into any one of the plurality of player characters constituting the party by the predetermined method. The non-player character that is different from any one of the plurality of player characters constituting the party may be used as the operation object as the temporary character. In this case, for example, as the normal character, a party composed of two characters including the character A and the character B may be configured and the game may be progressed. The battle where the non-player character that can be the temporary character exists is generated.

In this case, the level of the character B is lower than the level of the non-player character that becomes the temporary character. However, it is assumed that the level of the character A is higher than the level of the corresponding non-player character. In this case, when the character A is used as the operation object, the operation object can be switched into the non-player character that becomes the temporary character. When the character B is used as the operation object, the operation object cannot be switched into the corresponding non-player character.

For example, when the operation object is switched to the non-player character that can be the temporary character from the character A, the HP that is set to the temporary character can be inherited by the character A, but cannot be inherited by the character B. In this case, due to not only the fact that the character to be the operation object is switched from the normal character to the non-player character that can be the temporary character, but also the fact, from which of the plurality of normal characters, the character to be the operation object is switched, the progress of the game thereafter varies. Therefore, a strategic characteristic of the game can be improved, and an amusement of the game can be increased.

In the above embodiment, when the operation object is switched back to the normal character from the temporary character used as the operation object, the HP of the temporary character and the used special ability are inherited by the normal character. Meanwhile, instead of the HP and the special ability, or in addition to the HP and the special ability, a maximum value of the HP, an MP (Magic Point) that is decreased whenever a special ability of magic or the like is used, and a maximum value of the MP of the temporary character may be inherited by the normal character. Further, a parameter that is set as ability data of other kinds of characters may be inherited.

Further, an attribute causing to increase/decrease an effect of a special ability such as magic (for example, attributes are set to both the special ability and the player character, and when the special ability is used, if the attribute set to the special ability is the same as the attribute set to the player character, the effect increases) of the temporary character which becomes the operation object may be inherited by the normal character. Further, an ability that determines a kind of a usable special ability (for example, recovery magic can be exercised, if the player character gains a specific ability and then satisfies other conditions (level and the like)) of the temporary character that becomes the operation object may be inherited by the normal character.

Further, in regards to the weapon that the player character carries to attack the enemy character or the protective equipment that the player character carries to alleviate the effect of the attack from the enemy character, the normal character may carry the weapon and the protective equipment that the temporary character carries. Among the items (if the items are used once, the items disappear) that are used to attack the enemy character or recover the lowered parameter, an item that the temporary character has may be gained by the normal character. Further, the weapon or the protective equipment is the equipment that determines an ability of the normal character, but may appear as an appearance feature.

Further, other than the matters determining the ability of the character as described above, appearance feature having no relation with the ability may be inherited by the normal character from the temporary character. For example, when the appearance feature of the normal character can be customized by the selection of the player (for example, when the clothes that the normal character wears can be changed), the clothes that the temporary character wears may be added to choices of the clothes that the normal character wears. As such, the appearance feature that is inherited by the normal character from the temporary character may be of a different kind, such as an accessory or a color of hair.

In this case, if the player switches the character to be the operation object from the normal character to the temporary character, the player can actually feel the change in the appearance feature like the case where the normal character gains the characteristic of the temporary character, from the display screen. Further, the player can feel as if the normal character is possessed by the temporary character, after the operation object is switched back to the normal character. As a result, it is possible to increase an amusement that the player feels when the character to be the operation object in the battle is switched from the normal character to the temporary character.

Further, the weapon or the appearance feature of the same kind as the weapon or the appearance feature that are inherited by the normal character from the temporary character as in the above modification can be inherited by the temporary character from the normal character, when the operation object is switched into the non-player character that can be the temporary character. For example, when the normal character wears the predetermined accessory, the temporary character (that does not wear the predetermined accessory before switching) may wear the predetermined accessory.

In this case, in contrast as the case where the normal character inherits the appearance feature of the temporary character, when the operation object is switched into the non-player character that can be the temporary character, the player can feel as if the temporary character is possessed by the normal character. As a result, it is possible to increase an amusement when the operation object is switched from the normal character to the non-player character that can be the temporary character in the battle.

In the above embodiment, up to the predetermined amount the HP of the temporary character is inherited by the normal character, but the inherited amount may not be restricted. Alternatively, the HP of the temporary character may not be necessary inherited by the normal character and a lottery may be used to determine whether the HP is inherited by the normal character whenever the operation object is switched into the non-player character that can be the temporary character, whereby the HP of the temporary character may be inherited by the normal character, with the predetermined probability.

In the above embodiment, at timing when the operation object is switched back from the temporary character to the normal character, the HP of the temporary character may be inherited by the normal character. The battle may be completed in a state where the temporary character is used as the operation object. In this case, the HP of the temporary character that becomes the operation object at the time of the battle completion may be inherited by the normal character at the corresponding point of time. Further, regardless of whether the operation object at the time of the battle completion is the normal character or the temporary character, the HP of the temporary character may be inherited when the battle is completed.

In the above embodiment, in the battle, only the player character (the normal character or the temporary character) can exercise the special ability, such as the magic attack on the enemy character or the recovery magic to recover the HP of the player character itself, but the enemy character may also exercise the same special ability. Further, the kind of the special ability that the player character (and the enemy character) can exercise is not restricted to the above example. However, the player character may inactivate the predetermined ability (for example, effect of a magic attack of the predetermined kind) that the enemy character has or generate a status change to improve the ability of the player character itself only during the predetermined period (for example, increases a damage applied to the enemy character by the attack or decreases a time interval until the player character can take an action).

In the above embodiment, in the operation object switchable mode, the player can instruct to switch the operation object from the normal character to the non-player character that can be the temporary character. At this time, the normal character can take the action other than the movement, but cannot move on the field (because the directional key is used to switch the target). Meanwhile, during the operation object switchable mode, all actions including the movement of the normal character may be impossible. Alternatively, in the operation object switchable mode, in regards to both the movement and the actions other than the movement, the normal character may not be restricted.

If the normal character cannot take all of the actions including the movement in the operation object switchable mode, the operation object switchable mode is a very dangerous situation for the player because the normal character cannot take any action and is unilaterally attacked by the enemy character. Therefore, the psychological time restriction that is applied to the player in regards to the switching of the operation object can become further strict to the player.

In the above embodiment, after the operation object is switched from the normal character to the non-player character that can be the temporary character, if time that is counted from a point of time when the mode is switched into the operation object switchable mode reaches the predetermined time, the operation object is switched back from the temporary character to the normal character. The condition that the operation object is switched back from the temporary character to the normal character may be that the player performs the predetermined operation. The operation object may be switched back to the normal character on the basis of the elapsed time or/and the operation object may be switched back to the normal character on the basis of the operation from the player.

In the above embodiment, the operation object may be switched into the non-player character that can be the temporary character, only when the normal character becomes the operation object. When there are a plurality of non-player characters that become the temporary character, when the temporary character becomes the operation object, the operation object may be switched into another non-player character that becomes temporary character. The number of times of switching the operation object from the temporary character to another non-player character that can be temporary character may not be restricted or may be restricted according to the non-player characters that can be the temporary character.

For example, when the operation object of the player is changed in the order of the normal character, the first temporary character, the second temporary character, and the normal character, the HPs and the special abilities of both the first temporary character and the second temporary character may be inherited by the normal character. Alternatively, the HP and the special ability of only the first temporary character (temporary character that firstly becomes the operation object) may be inherited or the HP and the special ability of only the second temporary character (temporary character that finally becomes the operation object) may be inherited.

In the above embodiment, when the battle is completed in a state where the temporary character becomes the operation object, the operation object of the player in the game after the completion of the corresponding battle is switched back to the normal character. If the battle is completed in a state where the temporary character becomes the operation object, in the game after the completion of the corresponding battle, the temporary character may be switched to be the operation object. In addition, if there is a non-player character that becomes another temporary character at a next battle, the corresponding non-player character can be switched to be the operation object as a new temporary character.

However, the game cannot be progressed indefinitely in a state where the temporary character (including a new temporary character that is switched to be the operation object from the temporary character) is switched to be the operation, and when the predetermined event is generated in the progress of the game (for example, when the battle with the boss enemy character starts or when one stage is completed and a new stage starts), the operation object of the player needs to be switched back to the normal character.

Further, in the case where the game can be progressed in a state where temporary character is maintained as operation object after the completion of the battle, when the shaded portion shown in the operation object switching time gauge 308 disappears after the temporary character is switched to be the operation object, the operation object may not be switched back to the normal character. Even when the player instructs switching of the operation object back to the normal character, the operation object may not be switched back to the normal character.

In the above embodiment, if there is a non-player character that can be the temporary character and a condition such as a level difference or a distance of the normal character and the non-player character is satisfied, the mode can be changed to the operation object switchable mode at any time by the operation from the player and whereby the non-player character can be the operation object as the temporary character. Meanwhile, the mode can be changed to the operation object switchable mode by consuming a predetermined parameter (MP or the like) that is set to the normal character (that is, under the condition that a sufficient amount remains in the predetermined parameter).

Further, in the case where the normal character can take the actions other than the movement on the field under the condition that the predetermined time or more elapses after the previous action (or battle starts), when another action can be taken after the predetermined time elapses from a point of time of the previous action, the mode may be switched into the operation object switchable mode. In the case where there are a plurality of non-player characters that can be the temporary character, when the predetermined time or more elapses after the operation object is switched back from the temporary character to the normal character, another non-player character as the temporary character may be used as the operation object.

In the above embodiment, the operation object may be switched from the normal character to the non-player character that can be the temporary character when the level of the normal character is higher than the level of the non-player character, or when the distance between the normal character and the non-player character becomes the predetermined distance or less are satisfied. However, the condition that allows switching of the operation object is not limited to the above example, but a parameter (HP or the like) other than the level may be used.

Further, the positional relationship between the normal character and the non-player character using the condition that enables switching of the operation object is not limited to only the distance between the normal character and the non-player character. For example, even though the distance between the normal character and the non-player character is the predetermined distance or less, when an obstacle exists between the normal character and the non-player character, the operation object may not be switched. Alternatively, a direction of the normal character and the non-player character (face each other or the like) may be used as the condition. A positional relationship among the three parties including the enemy character in addition to the normal character and the non-player character may be used as the condition.

Further, the positional relationship between the normal character and the non-player character using the condition that enables switching of the operation object may be varied in accordance with the elapsed time. For example, when the battle starts or when the operation object is switched back from the temporary character to the normal character, time count may be started. Alternatively, when the normal character takes any action other than the movement, the time count may be started. As the counted time is increased, the distance between the normal character and the non-player character that enables switching of the operation object may be decreased.

In this case, for example, if the normal character is moved to a position that enables switching of the operation object at certain timing during the battle, even in the case where the position of the normal character may become a disadvantageous position with respect to the position of the enemy character, the normal character can be disposed at a position that is not disadvantageous with respect to the position of the enemy character and enables switching of the operation object, by waiting for the time to elapse. As a result, a strategic characteristic in the battle can be improved.

In the above embodiment, the battle with the boss enemy character is generated on a final scene of one stage. However, information such as a weakness of the boss enemy character that appears herein may be provided from the non-player character that the normal character encounters. When the enemy character that appears the previously performed battle has the same characteristic as the boss enemy character, information that is related to the boss enemy character (weakness) may be indirectly shown. In this case, a width of thinking of the player can be widened and an amusement of the game can be increased. Further, even in the battle with the enemy character where capturing is easy, the player can play an amuse battle game.

In the above embodiment, the boss enemy character has a weakness in that damage increases with respect to the special ability that the normal character can gain by switching of the operation object into the non-player character that can be the temporary character. However, a condition necessary to win the battle with the boss enemy character may be set the condition that the normal character gained a certain special ability (that can be gained only by switching the operation object into the non-player character that can be the temporary character) before the battle occurs. As a result, since the switching of the operation object from the normal character to the non-player character that can be the temporary character becomes necessary in the game, the effect of the present invention can be further realized.

In this case, the player needs to progress the game while paying attention to information related to the boss enemy character that is shown until the normal character reaches a battle point 204 with the boss enemy character. As a result, the game that is progressed before the normal character reaches the battle point with the boss enemy character becomes meaningful. Further, even though the player character can easily win the battle with the enemy character other than the boss enemy character, the normal character needs to be good at the special ability by switching the operation object into the non-player character that can be the temporary character until the battle with the boss enemy character. Even in the case of the battle with the enemy character that can be relatively easily captured, since the corresponding battle is coupled with the battle with the boss enemy character, an amusement can be provided to the player.

In the above embodiment, the action RPG where the movement of the player character (normal character) on the field and the battle with the enemy character are seamlessly developed has been exemplified. However, the game where the present invention can be applied is not limited to the action RPG. For example, the present invention may be applied to an RPG where the player character (normal character) reaches the predetermined point on the field, the field is switched into a battle field, and a battle between the player character and the enemy character is developed on the battle field.

In the above embodiment, the portable game machine 1 is applied as a platform that executes a three-dimensional video game to realize the present invention. However, a computer device that executes a video game where the present invention is applied may be a game dedicated apparatus or a general-purpose apparatus, such as a personal computer. The computer device may have a portable type or a fixed type. Further, a mobile phone may be used as the computer device that executes a game where the present invention is applied.

In the above embodiment, a program and data of the portable game machine 1 are stored in the recording medium 44 and distributed. Meanwhile, the program and data may be stored in a fixed disk device that is included in a sever device existing on the Internet and may be distributed to the portable game machine 1 through the Internet. In the portable game machine 1, a program and data that the wireless interface device 50 receives from the server device may be stored in the external storage device 40 and may be loaded to the memory 30 at the time of execution.

What is claimed is:

1. A game apparatus that executes a video game, in which player characters are operated in accordance with an operation of a player, the player characters including at least one temporary character configured to temporarily be an operation object of the player in the progress of the game and a normal character configured to normally be the operation object of the player in the progress of the game, the game apparatus comprising:

an ability data storage configured to store, in a memory, first ability data specifying a first ability of the normal character in the game and second ability data specifying a second ability of the temporary character in the game;

a switching determiner configured to determine, with a processor, whether it is possible or not to switch an operated character that is the operation object of the player between the player characters, in accordance with a switching instruction input from the player for switching the operated character;

an operated character switcher configured to switch, with the processor, the operated character from the normal character to the temporary character in accordance with the switching instruction input from the player, when the switching determiner determines that it is possible to switch the operated character;

an operated character operator configured to operate, with the processor, the operated character, in accordance with the switching instruction input from the player, in accordance with a corresponding ability value of the first ability data and the second ability data for the operated character; and an ability data updater configured to update, with the processor and in the memory, the first ability data of the normal character in accordance with the second ability data of the temporary character switched to be the operated character, when the operated character switcher switches the operated character.

2. The game apparatus according to claim 1, further comprising:

a mode instruction input configured to input a mode instruction from the player to switch a mode into a switchable mode in which reception of the switching instruction input from the player to switch the operated character is enabled;

a mode switcher configured to switch the mode from a non-switchable mode in which the reception of the switching instruction input from the player to switch the operated character is disabled, to the switchable mode, in accordance with the mode instruction input from the mode instruction input;

a character operation restrictor configured to restrict the operation of the operated character by the operated character operator, when the mode is the switchable mode; and an enemy character operator configured to operate the enemy character, when the mode is the switchable mode.

3. The game apparatus according to claim 2, wherein the video game is a three-dimensional video game configured to generate a display screen of the game by performing a perspective transformation of a three-dimensional virtual space by a virtual camera, and the game apparatus further comprises a virtual camera controller configured to control a position of a visual point of the virtual camera to perform the perspective transformation to a predetermined position for the operated character when the mode is not the switchable mode, and configured to control the position of the visual point to a position of the operated character when the mode is the switchable mode.

4. The game apparatus according to claim 1, further comprising:

a display controller configured to control a special effect display on the display screen of the game, when the operated character switcher switches the operated character.

5. The game apparatus according to claim 1, further comprising:

a character mover configured to move the normal character on a field where a battle occurs when the normal character is the operated object while the battle is progressing, wherein the operated character switcher is configured to switch the operated character when a positional relationship between the normal character and the temporary character according to the movement by the character mover is a predetermined positional relationship.

6. The game apparatus according to claim 5, further comprising:

a timer configured to count time elapsed from a predetermined timing associated with the battle, wherein the predetermined positional relationship is configured to vary in accordance with the time counted by the timer.

7. The game apparatus according to claim 1, wherein, when the corresponding ability data for the operated character specifies that the operated character has plural kinds of abilities, the ability data updater is configured to update the first ability data of the normal character in accordance with the second ability data, based on one of the plural kinds of abilities corresponding to an ability instruction input from the player to operate the operated character based on the one of the plural kinds of abilities when the operated character switcher switches the operated character.

8. The game apparatus according to claim 1, further comprising:

a temporary ability data changer configured to change the second ability data of the temporary character switched to be the operated character in accordance with ability data of the normal character, when the operated character switcher switches the operated character.

9. The game apparatus according to claim 1, wherein the player characters includes a plurality of temporary characters, and each of the plurality of temporary characters is configured to be switched to the operated character by the operated character switcher, the ability data storage is configured to store third ability data of at least one first temporary character of the plurality of temporary characters, which is different from fourth ability data of at least one different temporary character, and a first number of the plurality of temporary characters which are configured to be used when the ability data updater updates the first ability data of the normal character is smaller than a second number of the plurality of temporary characters which are configured to be switched to the operated character by the operated character switcher.

10. A non-transitory computer readable medium including an executable computer program configured to be executed by a computer for playing a video game in which player characters are operated in accordance with an operation of a player, the player characters including at least one temporary character configured to temporarily be an operation object of the player in the progress of the game and a normal character configured to normally be the operation object of the player in the progress of the game, the non-transitory computer readable medium comprising:

an executable ability data managing segment stored on the non-transitory computer readable medium that, when executed, stores first ability data specifying a first ability of the normal character in the game and second ability data specifying a second ability of the temporary character in the game in a storage of the computer and manages the ability data;

an executable switching determining segment stored on the non-transitory computer readable medium that, when executed, determines whether it is possible to switch an operated character that is the operation object of the player between the player character, in accordance with a switching operation of the player from an input of the computer for switching the operated character;

an executable operated character switching segment stored on the non-transitory computer readable medium that, when executed, switches the operated character from the normal character to the temporary character in accordance with the switching instruction of the player from the input of the computer, when the switching determining segment determines that it is possible to switch the operated character;

an executable operated character operating segment stored on the non-transitory computer readable medium that, when executed, operates the operated character in accordance with a predetermined instruction that is input by the player from the input of the computer, in accordance with a corresponding ability value of the first ability data and the second ability data for the operated character; and an executable ability data updating segment stored on the non-transitory computer readable medium that, when executed, updates the first ability data of the normal character managed in the storage in accordance with the second ability data of the temporary character switched to be the operated character, when the operated character switching segment switches the operated character.

11. The game apparatus according to claim 1, wherein the player characters include a plurality of temporary characters, and the operated character switcher is configured to switch the normal character to one of the plurality of temporary characters at a position closest to the normal character.

12. The game apparatus according to claim 1,
wherein the player characters include a plurality of temporary characters, and
the operated character switcher is configured to sequentially switch the operated character from the normal character to the plurality of temporary characters in accordance with the switching instruction input from the player.

13. The game apparatus according to claim 1,
wherein the player characters include a plurality of temporary characters, and
the operated character switcher is configured to switch the normal character to one of the plurality of temporary characters based on a type of the switching instruction input from the player.

14. The game apparatus according to claim 1,
wherein the switching determiner is configured to determine that it is not possible to switch the operated character from the normal character to the temporary character when a first level of the temporary character exceeds a second level of the normal character.

15. The game apparatus according to claim 1,
wherein the operated character switcher is configured to switch the operated character from the normal character to the temporary character for a predetermined period of time.

16. The non-transitory computer readable medium according to claim 10,
wherein the player characters include a plurality of temporary characters, and
the executable operated character switching segment, when executed, switches the normal character to one of the plurality of temporary characters at a position closest to the normal character.

17. The non-transitory computer readable medium according to claim 10,
wherein the player characters include a plurality of temporary characters, and
the executable operated character switching segment, when executed, sequentially switches the operated character from the normal character to the plurality of temporary characters in accordance with the switching operation of the player from the input of the computer.

18. The non-transitory computer readable medium according to claim 10,
wherein the player characters include a plurality of temporary characters, and
the executable operated character switching segment, when executed, switches the normal character to one of the plurality of temporary characters based on a type of the switching operation of the player from the input of the computer.

19. The non-transitory computer readable medium according to claim 10,
wherein the executable switching determining segment, when executed, determines that it is not possible to switch the operated character from the normal character to the temporary character when a first level of the temporary character exceeds a second level of the normal character.

20. The non-transitory computer readable medium according to claim 10,
wherein the executable operated character switching segment, when executed, switches the operated character from the normal character to the temporary character for a predetermined period of time.

* * * * *